(12) United States Patent
Kohama

(10) Patent No.: US 8,284,294 B2
(45) Date of Patent: Oct. 9, 2012

(54) COMPOUND-EYE IMAGE PICKUP APPARATUS

(75) Inventor: Masaki Kohama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 192 days.

(21) Appl. No.: 12/892,722

(22) Filed: Sep. 28, 2010

(65) Prior Publication Data

US 2011/0075018 A1  Mar. 31, 2011

(30) Foreign Application Priority Data

Sep. 29, 2009  (JP) ................................. 2009-225037

(51) Int. Cl.
 G03B 13/00 (2006.01)
 G03B 35/00 (2006.01)
 H04N 5/232 (2006.01)
 H04N 5/225 (2006.01)
 H04N 9/09 (2006.01)
 H04N 9/097 (2006.01)
 H04N 13/02 (2006.01)

(52) U.S. Cl. ............ 348/345; 348/262; 348/46; 352/57; 396/324

(58) Field of Classification Search .......................... None
See application file for complete search history.

(56) References Cited

U.S. PATENT DOCUMENTS

| 5,864,360 A | 1/1999 | Okauchi et al. | |
| 6,292,634 B1 * | 9/2001 | Inaba | 396/326 |
| 6,301,446 B1 * | 10/2001 | Inaba | 396/324 |
| 6,864,910 B1 * | 3/2005 | Ogino et al. | 348/42 |
| 2008/0131107 A1 * | 6/2008 | Ueno | 396/50 |
| 2008/0158346 A1 * | 7/2008 | Okamoto et al. | 348/47 |
| 2008/0158384 A1 * | 7/2008 | Okamoto et al. | 348/231.2 |
| 2008/0316300 A1 * | 12/2008 | Okamoto | 348/47 |
| 2009/0123144 A1 * | 5/2009 | Maezono | 396/327 |

FOREIGN PATENT DOCUMENTS

| JP | 07-067023 A | 3/1995 |
| JP | 2002-131628 A | 5/2002 |
| JP | 2005-173270 A | 6/2005 |
| JP | 2006-162990 A | 6/2006 |

* cited by examiner

Primary Examiner — Justin P Misleh
(74) Attorney, Agent, or Firm — Sughrue Mion, PLLC

(57) ABSTRACT

A compound-eye image pickup apparatus includes: a plurality of image pickup devices each including a focusing lens; a moving device configured to move the focusing lens; an automatic focusing device configured to cause the moving device to move the focusing lens within a predetermined range, to acquire focusing positions of each of the plurality of image pickup devices; and a detecting device configured to detect whether or not the focusing position can be acquired, wherein when the detecting device detects that the focusing position of at least one of the plurality of image pickup devices is acquired and the focusing position of the remaining image pickup device is not acquired, the automatic focusing device moves the focusing lens of the image pickup device for which it is detected that the focusing position thereof is not acquired, within an additional range outside of the predetermined range to acquire the focusing position thereof.

8 Claims, 12 Drawing Sheets

RELATED ART

COMPOUND-EYE IMAGE PICKUP APPARATUS

BACKGROUND OF THE INVENTION

1. Field of the Invention

The presently disclosed subject matter relates to a compound-eye image pickup apparatus, and more particularly, to a compound-eye image pickup apparatus including a plurality of image pickup devices.

2. Description of the Related Art

Japanese Patent Application Laid-Open No. 07-67023 describes a compound-eye image pickup apparatus including two video cameras, in which a focusing operation is performed on the same subject when optical axes coincide with each other and is performed on the part at which angles of view coincide with each other when the optical axes do not coincide with each other. In addition, the art described in Japanese Patent Application Laid-Open No. 07-67023 describes that, because variations in right and left lens units cause the difference between angles of view, the displacement of an optical axis during zooming, and the deviation of timing in focusing, data for making the angles of view coincide with each other, correspondence data of focusing positions, and the like are stored.

Japanese Patent Application Laid-Open No. 2005-173270 describes a compound-eye image pickup apparatus that uses only a signal obtained by one of two image pickup devices to perform the focusing operation.

Japanese Patent Application Laid-Open No. 2006-162990 describes a compound-eye image pickup apparatus that simultaneously drives two image pickup devices to perform a focusing process, and moves another image pickup device in accordance with a focusing position of one image pickup device whose focusing position is found earlier.

Japanese Patent Application Laid-Open No. 2002-131628 describes a compound-eye image pickup apparatus in which: one of two image pickup devices photographs a moving image; another one of the image pickup devices photographs a still image; the image pickup device that photographs a moving image is continuously searched for the focusing position; and the image pickup device that photographs a still image performs the focusing operation on the basis of information on the focusing position supplied from the image pickup device that photographs a moving image.

SUMMARY OF THE INVENTION

However, the arts described in Japanese Patent Application Laid-Open Nos. 07-67023, 2005-173270, and 2006-162990 presuppose that the focusing positions of both of the two image pickup devices can be obtained, and do not assume a case where, due to the individual variability in the image pickup device, the focusing position of one of the image pickup devices can be detected, whereas the focusing position of another one of the image pickup devices cannot be detected.

The focusing process is performed in the following manner. That is, focusing lenses 12b and 13b are moved in predetermined steps within a predetermined range (hereinafter, referred to as AF (automatic focus adjustment) search range) from an MOD (the end on the nearest side of a normal photography region) to an infinite distance, a focusing evaluation value is acquired for each position, a position at which the acquired focusing evaluation value is maximum is set as the focusing position, and the focusing lenses 12b and 13b are moved to the set position. At the time of shipment from a factory, as illustrated in FIG. 15A, the AF search ranges of a right lens and a left lens are adjusted so that the AF search ranges of the right lens and the left lens coincide with each other at normal (room) temperature (temperature at the time of the shipment from the factory).

However, the environment in which the compound-eye image pickup apparatus is used is not always at normal (room) temperature, and the compound-eye image pickup apparatus is used also at high temperature and low temperature. As illustrated in FIG. 15B, in the case where the compound-eye image pickup apparatus is used at high temperature, the AF search ranges of the right lens and the left lens may be different from each other due to a change in dimensions of a lens or a lens barrel and the like. When a position indicated by the dotted line in FIG. 15B is set as the focusing position, the focusing position of the right lens can be detected, but the focusing position of the left lens cannot be detected.

In order to solve this problem, a method of expanding the AF search range of the left lens which is out of focus to a macro region can be conceived. However, this method is against the purpose of avoiding searching the macro region and limiting the AF search range to a range from the MOD to the telephoto side, that is, shortening the search time, and hence there arises a problem that it takes time before a lens comes into focus.

Alternatively, a method of employing a special image pickup device having high performance or selecting image pickup devices having similar performance can be conceived. However, it is difficult to completely eliminate the individual variability in image pickup device. In addition, there arises a problem that the adoption of an image pickup device including an expensive lens and the like with a smaller individual variability leads to an increase in cost. In particular, in a compound-eye camera including a plurality of image pickup devices, an amount of increase in cost becomes larger in accordance with the number of the image pickup devices. This is not necessarily a result desired by a user.

The presently disclosed subject matter has been made in view of the above-mentioned circumstances, and therefore has an object to provide a compound-eye image pickup apparatus that is capable of acquiring in a short time, even when there occurs a problem that a focusing position of only a part of image pickup devices cannot be acquired due to the individual variability in image pickup device, the focusing position of the image pickup device whose focusing position cannot be acquired.

A first aspect of the presently disclosed subject matter provides a compound-eye image pickup apparatus including: a plurality of image pickup devices each including a focusing lens; a moving device configured to move the focusing lens, the moving device being provided for each focusing lens; an automatic focusing device configured to cause the moving device to move the focusing lens within a predetermined range, to thereby acquire focusing positions of each of the plurality of image pickup devices; and a detecting device configured to detect whether or not the focusing position is acquired by the automatic focusing device, wherein when the detecting device detects that the focusing position of at least one of the plurality of image pickup devices is acquired and the focusing position of the remaining image pickup device is not acquired, the automatic focusing device moves the focusing lens of the image pickup device for which it is detected that the focusing position thereof is not acquired, within an additional range outside of the predetermined range, to thereby acquire the focusing position thereof.

According to the compound-eye image pickup apparatus of the first aspect, a process of acquiring the focusing position of each of the plurality of image pickup devices is performed, and it is detected whether or not the focusing position is acquired by this process. When it is detected that the focusing position of at least one of the plurality of image pickup devices is acquired and the focusing position of the remaining image pickup device is not acquired, the focusing lens of the image pickup device for which it is detected that the focusing position thereof is not acquired is moved within the additional range outside of the predetermined range, to thereby acquire the focusing position thereof. This enables an appropriate focusing drive without extremely increasing a search time.

A second aspect of the presently disclosed subject matter provides a compound-eye image pickup apparatus of the first aspect, wherein: the image pickup devices each include: an image pickup element on which a subject image is formed by a photographing optical system including the focusing lens; and an image signal acquiring device configured to convert the subject image formed on the image pickup element into an image signal; the automatic focusing device stops the focusing lens for each predetermined position within the predetermined range; the image signal acquiring device acquires the image signal for each position at which the automatic focusing device stops the focusing lens; and the automatic focusing device includes: a focusing evaluation value calculating device configured to calculate a focusing evaluation value of the image signal which is acquired for each position by the image signal acquiring device; and an additional range calculating device configured to compare the focusing evaluation values which are calculated by the focusing evaluation value calculating device for each of the plurality of image pickup devices, to thereby obtain the additional range.

According to the compound-eye image pickup apparatus of the second aspect, the focusing lens is stopped for each predetermined position within the predetermined range, the image signal is acquired for each position at which the focusing lens is stopped, and the focusing evaluation value of the image signal which is acquired for each position is calculated. Then, the focusing evaluation values which are calculated for each of the plurality of image pickup devices are compared, to thereby obtain the additional range. This makes it possible to set an appropriate additional range and perform a recovery process from an out-of-focus state in a short time.

A third aspect of the presently disclosed subject matter provides a compound-eye image pickup apparatus of the second aspect, further including: wherein the additional range calculating device includes: a determination device configured to determine to which position within the predetermined range of the image pickup device whose focusing position is acquired by the detecting device an end portion of the predetermined range of the image pickup device whose focusing position is not acquired corresponds; a calculation device configured to calculate a distance between the detected position and the focusing position detected by the detecting device; and a setting device configured to set, as the additional range, a range between a position away from the end portion of the predetermined range by the calculated distance and the end portion of the predetermined range.

According to the compound-eye image pickup apparatus of the third aspect, it is detected to which position within the predetermined range of the image pickup device whose focusing position is detected the nearest end of the predetermined range of the image pickup device whose focusing position is not detected corresponds, and the distance between the detected position and the focusing position is calculated. Then, the range between the position away from the end portion of the predetermined range by the calculated distance and the end portion of the predetermined range is set as the additional range. This makes it possible to set an additional range within which the focusing position can reliably be detected.

A fourth aspect of the presently disclosed subject matter provides a compound-eye image pickup apparatus of the first aspect, further including: a first storage device configured to store therein a relation between a change amount of the predetermined range and a temperature; and a temperature detecting device configured to detect a temperature of each of the plurality of image pickup devices, wherein the automatic focusing device acquires, from the first storage device, the change amount of the predetermined range corresponding to the temperature detected by the temperature detecting device, and obtains the additional range on the basis of the acquired change amount.

According to the compound-eye image pickup apparatus of the fourth aspect, the temperature of each of the plurality of image pickup devices is detected, the change amount of the predetermined range corresponding to the detected temperature is acquired on the basis of the relation between the change amount of the predetermined range and the temperature, which is stored in the first storage device, and the additional range is obtained on the basis of the acquired change amount. This makes it possible to obtain the additional range by simple processing.

A fifth aspect of the presently disclosed subject matter provides a compound-eye image pickup apparatus of the fourth aspect, wherein the first storage device stores therein a maximum value of the change amount when an individual variability in image pickup device is taken into consideration, as the change amount of the predetermined range.

According to the compound-eye image pickup apparatus of the fifth aspect, the additional range is obtained on the basis of the maximum value of the change amount of the predetermined range when the individual variability in image pickup device is taken into consideration. This makes it possible to set the additional range within which the focusing position can reliably be detected.

A sixth aspect of the presently disclosed subject matter provides a compound-eye image pickup apparatus of the fourth aspect, wherein: the first storage device stores therein a maximum value and a minimum value of the change amount when an individual variability in image pickup device is taken into consideration, as the change amount of the predetermined range; and the automatic focusing device acquires, from the first storage device, a maximum value and a minimum value of the change amount of the predetermined range corresponding to the temperature detected by the temperature detecting device, and sets a difference between the acquired maximum value and the acquired minimum value as the additional range.

According to the compound-eye image pickup apparatus of the sixth aspect, the additional range is obtained on the basis of the difference between the maximum value and the minimum value of the change amount of the predetermined range when the individual variability in image pickup device is taken into consideration. This makes it possible to set a minimum additional range.

A seventh aspect of the presently disclosed subject matter provides a compound-eye image pickup apparatus of any one of the first to sixth aspects, wherein the automatic focusing device moves the focusing lens of the image pickup device for which it is detected that the focusing position thereof is not acquired, within a range obtained by adding a predetermined value to the additional range, to thereby acquire the focusing position thereof.

According to the compound-eye image pickup apparatus of the seventh aspect, the additional search is performed within the range obtained by adding the predetermined value to the additional range. This makes it possible to acquire the focusing position even in the case where the additional range is not sufficient due to an error or the like.

According to the presently disclosed subject matter, even when there occurs a problem that the focusing position of only a part of image pickup devices cannot be acquired due to the individual variability in image pickup device, it is possible to acquire in a short time the focusing position of the image pickup device whose focusing position cannot be acquired.

DETAILED DESCRIPTION OF THE PREFERRED EMBODIMENTS

Hereinafter, best modes for carrying out a compound-eye image pickup apparatus according to the presently disclosed subject matter are described in detail with reference to the accompanying drawings.

First Embodiment

Figure 1A:
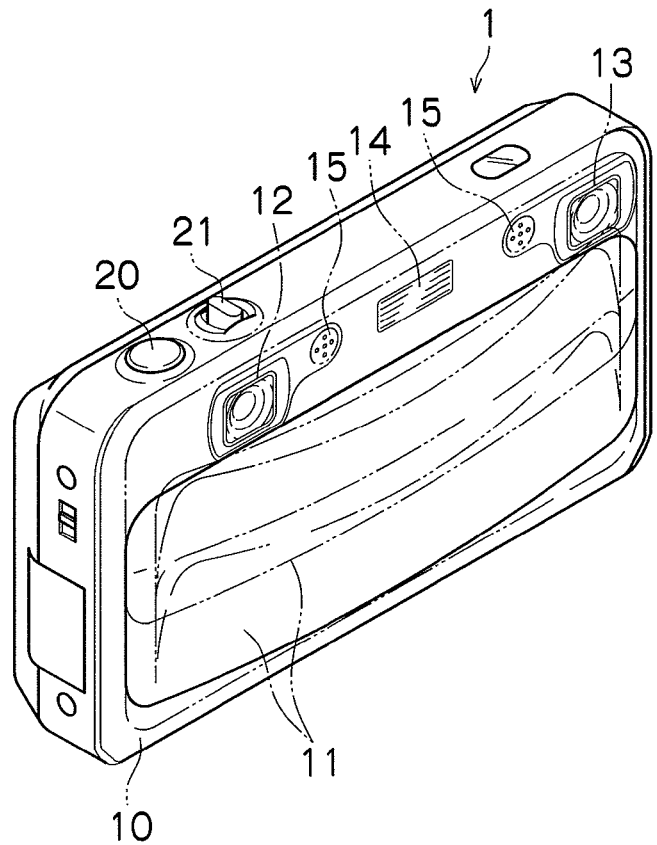
FIG. 1A is a front perspective view illustrating a compound-eye image pickup apparatus according to a first embodiment of the presently disclosed subject matter.
Figure 1B:
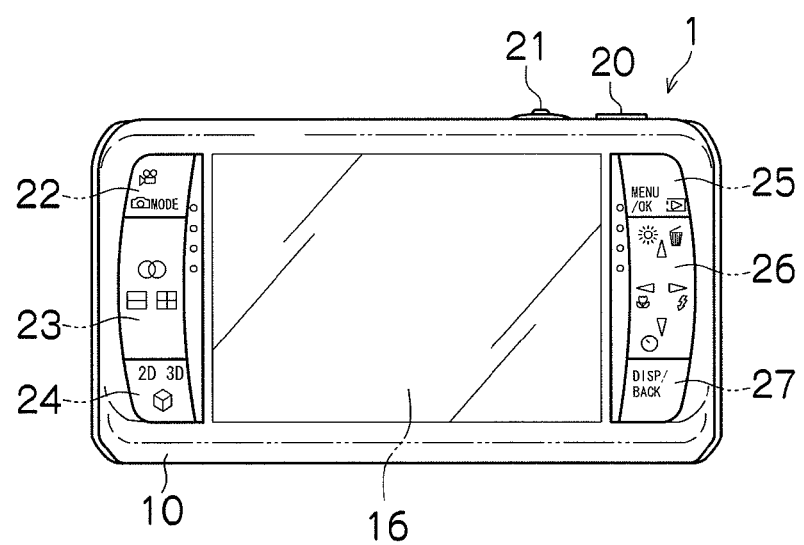
FIG. 1B is a back view illustrating the compound-eye image pickup apparatus according to the first embodiment.

FIGS. 1A and 1B are external views each illustrating a compound-eye image pickup apparatus 1 which is the compound-eye image pickup apparatus according to the presently disclosed subject matter. FIG. 1A is a front perspective view thereof, and FIG. 1B is a back view thereof. The compound-eye image pickup apparatus 1 includes a plurality of (for example, two in FIGS. 1A and 1B) image pickup systems, and is capable of photographing a stereoscopic image obtained by viewing the same subject at a plurality of points of view (for example, two right and left points of view in FIGS. 1A and 1B) and a single-viewpoint image (two-dimensional image). In addition, the compound-eye image pickup apparatus 1 is capable of not only photographing a still image but also recording and reproducing a moving image and a sound.

A camera body 10 of the compound-eye image pickup apparatus 1 is formed into a substantial rectangular parallelepiped box-like shape, and as illustrated in FIG. 1A, a barrier 11, a right image pickup system 12, a left image pickup system 13, a flashlight 14, and a microphone 15 are mainly provided on a front surface thereof. In addition, a release switch 20 and a zoom button 21 are mainly provided on an upper surface of the camera body 10.

On the other hand, as illustrated in FIG. 1B, a monitor 16, a mode button 22, a parallax adjustment button 23, a 2D/3D switching button 24, a MENU/OK button 25, a cross button 26, and a DISP/BACK button 27 are provided on a back surface of the camera body 10.

The barrier 11 is slidably attached to the front surface of the camera body 10, and when the barrier 11 is slid in an up and down direction, an opened state and a closed state are switched therebetween. In a normal state, as indicated by the dotted line in FIG. 1A, the barrier 11 is positioned at an upper end, that is, in the closed state, and objective lenses 12a and 13a and the like are covered by the barrier 11. With this configuration, the lenses and the like are prevented from being broken. When the barrier 11 is slid to thereby be positioned at a lower end, that is, in the opened state (see the solid line in FIG. 1A), the lenses and the like provided on the front surface of the camera body 10 are exposed. When a sensor (not illustrated) recognizes that the barrier 11 is in the opened state, the power is turned on by a CPU 110 (see FIG. 2), whereby photography is enabled.

The right image pickup system 12 that photographs an image for a right eye and the left image pickup system 13 that photographs an image for a left eye constitute an optical unit including a photographic lens group, diaphragm-function-provided mechanical shutters 12d and 13d (see FIG. 2), and a lens barrel that houses these members. The photographic lens group of the right image pickup system 12 and the left image pickup system 13 is a refractive optical system, and mainly includes the objective lenses 12a and 13a that take in light from a subject, a prism (not illustrated) that substantially orthogonally bends an optical path of light entering through the objective lens, focusing lenses 12b and 13b (see FIG. 2), and zoom lenses 12c and 13c (see FIG. 2). The objective lenses 12a and 13a are provided so as to be exposed on a front surface of the lens barrel, and the prism, the focusing lenses 12b and 13b, the zoom lenses 12c and 13c, and the diaphragm-function-provided mechanical shutters 12d and 13d are provided inside the lens barrel.

The flashlight 14 is formed of a xenon tube or an LED (light-emitting diode), and emits a flash of light to the subject as needed when a dark subject or a backlit subject is photographed.

The monitor 16 is a liquid crystal monitor which has a general aspect ratio of 4:3 and is capable of color display, and is capable of displaying both a stereoscopic image and a planar image. Although a detailed structure of the monitor 16 is not illustrated, the monitor 16 is a parallax barrier 3D monitor having a surface on which a parallax barrier display layer is provided. The monitor 16 is used as a user interface display panel when various setting operations are performed, and is used as an electronic viewfinder when an image is photographed.

On the monitor 16, it is possible to switch between a mode in which a stereoscopic image is displayed (3D mode) and a mode in which a planar image is displayed (2D mode). In the 3D mode, a parallax barrier having a pattern in which a light transmitting portion and a light shielding portion are alternately arranged at a predetermined pitch is generated on the parallax barrier display layer of the monitor 16, and stripe-shaped image fragments indicating right and left images are alternately arranged and displayed on an image display surface located below the parallax barrier display layer. In the case where the monitor 16 is used in the 2D mode or used as the user interface display panel, nothing is displayed on the parallax barrier display layer, and a single image is displayed as it is on the image display surface located below the parallax barrier display layer.

It should be noted that the monitor 16 is not limited to the parallax barrier system, and a lenticular system, an integral photography system using a microlens array sheet, a holography system using an interference phenomenon, and the like may be adopted therefor. In addition, the monitor 16 is not limited to the liquid crystal monitor, and an organic EL (electroluminescence) display and the like may be adopted therefor.

The release switch 20 is formed of a two-stage stroke type switch having so-called "half press" and "full press". In the compound-eye image pickup apparatus 1, at the time of photographing a still image (for example, at the time of selecting a still image photography mode by the mode button 22 or at the time of selecting the still image photography mode from the menu), when the release switch 20 is half pressed, photography preparation processes, that is, respective processes of AE (Automatic Exposure), AF (Auto Focus), and AWB (Automatic White Balance) are performed, and when the release switch 20 is full pressed, a photography and recording process of the image is performed. In addition, at the time of photographing a moving image (for example, at the time of selecting a moving image photography mode by the mode button 22 or at the time of selecting the moving image photography mode from the menu), when the release switch 20 is full pressed, the photography of the moving image is started, and when the release switch 20 is full pressed again, the photography thereof is ended.

The zoom button 21 is used for zoom operations of the right image pickup system 12 and the left image pickup system 13, and includes a zoom tele button 21T for giving an instruction to zoom to a telephoto side, and a zoom wide button 21W for giving an instruction to zoom to a wide angle side.

The mode button 22 functions as a photography mode setting device that sets a photography mode of the digital camera 1, and the photography mode of the digital camera 1 is set to various modes in accordance with a setting position of the mode button 22. The photography mode is categorized into the "moving image photography mode" for photographing a moving image and the "still image photography mode" for photographing a still image. Examples of the "still image photography mode" include: an "automatic photography mode" in which a diaphragm, a shutter speed, and the like are automatically set by the digital camera 1; a "face extraction photography mode" in which a face of a person is extracted for photographing; a "sports photography mode" suitable for photographing a moving object; a "scenery photography mode" suitable for photographing scenery; a "night scenery photography mode" suitable for photographing evening scenery and night scenery; a "diaphragm priority photography mode" in which the level of the diaphragm is set by a user and the shutter speed is automatically set by the digital camera 1; a "shutter speed priority photography mode" in which the shutter speed is set by a user and the level of the diaphragm is automatically set by the digital camera 1; a "manual photography mode" in which the diaphragm, the shutter speed, and the like are set by a user; and the like.

The parallax adjustment button 23 is a button for electronically adjusting the parallax at the time of photographing a stereoscopic image. When a right part of the parallax adjustment button 23 is pressed, the parallax between an image photographed by the right image pickup system 12 and an image photographed by the left image pickup system 13 is increased by a predetermined distance. When a left part of the parallax adjustment button 23 is pressed, the parallax between an image photographed by the right image pickup system 12 and an image photographed by the left image pickup system 13 is reduced by a predetermined distance.

The 2D/3D switching button 24 is a switch for giving an instruction to switch between a 2D photography mode for photographing a single-viewpoint image and a 3D photography mode for photographing a multi-viewpoint image.

The MENU/OK button 25 is used for calling a screen of various settings (menu screen) for photography and reproduction functions (MENU function) and also used for giving instructions to determine a selected content and execute processing (OK function), and settings of all adjustment items included in the compound-eye image pickup apparatus 1 are performed by using the MENU/OK button 25. When the MENU/OK button 25 is pressed at the time of photographing, for example, a setting screen for adjusting image qualities such as an exposure value, coloring, a photographic sensitivity (ISO speed), and the number of recording pixels is displayed on the monitor 16. When the MENU/OK button 25 is pressed at the time of reproduction, a setting screen for erasing an image and the like is displayed on the monitor 16. The compound-eye image pickup apparatus 1 operates in accordance with the conditions set on the menu screen described above.

The cross button 26 is a button for setting and selecting various menus or for zooming, and is provided so as to be operable by pressing in four directions, that is, up, down, right, and left, and a function according to the setting state of the camera is assigned to a button in each direction. For example, at the time of photographing, a function of switching turning on/off of a macro function is assigned to the left button, and a function of switching a flashlight mode is assigned to the right button. In addition, a function of switching brightness of the monitor 16 is assigned to the upper button, and a function of switching turning on/off and a time length of a self-timer is assigned to the lower button. In addition, at the time of reproduction, a function of frame-by-frame playback is assigned to the right button, and a function of frame-by-frame reverse playback is assigned to the left button. In addition, a function of deleting an image which is being reproduced is assigned to the upper button. In addition, at the time of the various settings, a function of moving a cursor displayed on the monitor 16 toward the button in each direction is assigned to the cross button 26.

The DISP/BACK button 27 functions as a button for giving an instruction to switch the display on the monitor 16. When the DISP/BACK button 27 is pressed during photography, the display on the monitor 16 is switched in order of ON→framing guide display→OFF. In addition, when the DISP/BACK button 27 is pressed during reproduction, the display on the monitor 16 is switched in order of normal reproduction→reproduction without character display→multi-reproduction. The DISP/BACK button 27 also functions as a button for giving instructions to cancel an input operation and to return to a previous operation state.

Figure 2:
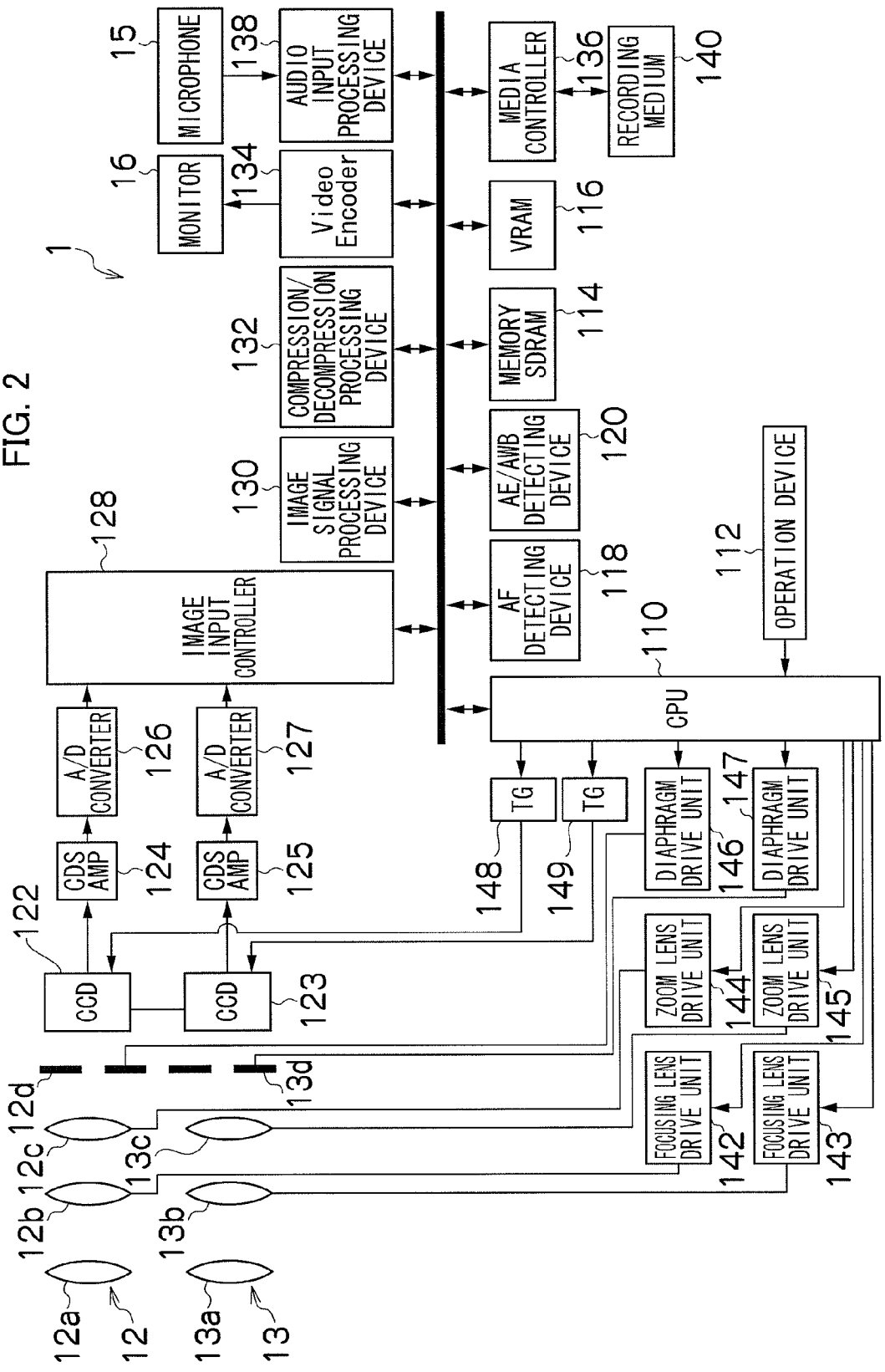
FIG. 2 is a block diagram illustrating an electrical configuration of the compound-eye image pickup apparatus according to the first embodiment.

FIG. 2 is a block diagram illustrating a main internal configuration of the compound-eye image pickup apparatus 1. The compound-eye image pickup apparatus 1 mainly includes the CPU (central processing unit) 110, an operation device (the release switch 20, the MENU/OK button 25, the cross button 26, and the like) 112, an SDRAM (Synchronous Dynamic Random Access Memory) 114, a VRAM (Video Random Access Memory) 116, an AF detecting device 118, an AE/AWB detecting device 120, image pickup elements 122 and 123, CDS/AMPs (Correlated Double Sampling/Amplifier) 124 and 125, A/D (analogue-to-digital) converters 126 and 127, an image input controller 128, an image signal processing device 130, a stereoscopic image signal processing unit 133, a compression/decompression processing device 132, a video encoder 134, a media controller 136, an audio input processing device 138, a recording medium 140, focusing lens drive units 142 and 143, zoom lens drive units 144 and 145, diaphragm drive units 146 and 147, and timing generators (TGs) 148 and 149.

The CPU 110 comprehensively controls an overall operation of the compound-eye image pickup apparatus 1. The CPU 110 controls the operations of the right image pickup system 12 and the left image pickup system 13. Basically, the right image pickup system 12 and the left image pickup system 13 are operated in a linked manner, but it is also possible to operate the right image pickup system 12 and the left image pickup system 13 independently of each other. In addition, the CPU 110 creates stripe-shaped image fragments from two pieces of image data obtained by the right image pickup system 12 and the left image pickup system 13, and generates image data for display in which the created image fragments are alternately displayed on the monitor 16. When the display is performed in the 3D mode, the parallax barrier having the pattern in which the light transmitting portion and the light shielding portion are alternately arranged at a predetermined pitch is generated on the parallax barrier display layer, and the stripe-shaped image fragments indicating right and left images are alternately arranged and displayed on the image display surface located below the parallax barrier display layer, whereby a spectroscopic view is enabled.

The SDRAM 114 records therein various programs including firmware which is a control program executed by the CPU 110, various data necessary for the control, a camera setting value, and the like.

The VRAM 116 is a temporary memory for displaying an image, and is also used as a work area of the CPU 110.

The AF detecting device 118 calculates, according to a command from the CPU 110, a focusing evaluation value in a predetermined focus area (focusing evaluation region) on the basis of image signals which are inputted respectively from the right image pickup system 12 and the left image pickup system 13. The AF detecting device 118 includes a high-pass filter that allows only high-frequency components of the inputted image signals to pass therethrough, an absolute value acquisition processing unit, a focus area extraction unit that cuts out a signal within the predetermined focus area, an integration unit that integrates absolute value data within the focus area, and the like, and outputs a value integrated by the integration unit to the CPU 110 as the focusing evaluation value.

In the compound-eye image pickup apparatus 1 according to the present embodiment, the AF control is performed in accordance with the contrasts of images obtained by the image pickup elements 122 and 123 (so-called contrast AF), and the AF detecting device 118 calculates the focusing evaluation value indicating image sharpness on the basis of the inputted image signals. The CPU 110 detects a position at which the focusing evaluation value calculated by the AF detecting device 118 is at a local maximum, and moves the focusing lenses 12b and 13b to the detected position. That is, the focusing lenses 12b and 13b are moved in predetermined steps within a predetermined search range (from an MOD to an infinite distance), the focusing evaluation value is acquired for each position, a position at which the acquired focusing evaluation value is maximum is set as the focusing position, and the focusing lenses 12b and 13b are moved to the set position. It should be noted that the MOD refers to a limit on the nearest side of a normal photography region, and is equal to a drive limit on the nearest side, of each of the focusing lenses 12b and 13b at the time of the AF.

The AE/AWB detecting device 120 calculates, according to the command from the CPU 110, physical amounts necessary for the AE control and the AWB control on the basis of the inputted image signals. For example, as the physical amount necessary for the AE control, one screen is divided into a plurality of areas (for example, 16×16), and an integrated value of image signals of R (red), G (green), and B (blue) is calculated for each divided area. The CPU 110 detects the brightness of a subject (subject luminance) on the basis of the integrated value obtained from the AE/AWB detecting device 120, and calculates an exposure value suitable for photographing (photography EV value). Then, the CPU 110 decides an aperture value and a shutter speed on the basis of the calculated photography EV value and a predetermined program chart. In addition, as the physical amount necessary for the AWB control, one screen is divided into a plurality of areas (for example, 16×16), and a color-based average integrated value of image signals of R, G, and B is calculated for each divided area. The CPU 110 obtains a ratio of R/G and a ratio of B/G for each divided area on the basis of the obtained integrated value for R, the obtained integrated value for B, and the obtained integrated value for G, and identifies a light source type on the basis of the distribution in color space of R/G and B/G of the obtained R/G and B/G values. Then, in accordance with a white balance adjustment value suitable for the identified light source type, the CPU 110 decides a gain value (white balance correction value) with respect to each of the R, G, and B signals of a white balance adjustment circuit so that, for example, the ratio of the respective values becomes approximately 1 (specifically, an integration ratio of R, G, and B on one screen is R:G:B≈1:1:1).

The image pickup elements 122 and 123 each include a color CCD (charge-coupled device) in which color filters of R, G, and B having a predetermined color filter array (for example, honeycomb array and Bayer array) are provided. The image pickup elements 122 and 123 receive light of the subject which is imaged by the focusing lenses 12b and 13b, the zoom lenses 12c and 13c, and the like, and the light which has entered the light receiving surface is converted into an amount of signal electric charges by each photodiode arranged on the light receiving surface, the amount corresponding to an amount of entering light. In a light electric charge accumulation and transfer operation performed by the image pickup elements 122 and 123, an electronic shutter speed (light electric charge accumulation time) is decided on the basis of an electric charge discharging pulse inputted by each of the TGs 148 and 149.

That is, when the electric charge discharging pulses are being inputted to the image pickup elements 122 and 123, electric charges are discharged without being accumulated into the image pickup elements 122 and 123. On the other hand, when the input of the electric charge discharging pulses to the image pickup elements 122 and 123 stops, the electric charges are not discharged anymore, so that the image pickup elements 122 and 123 start the electric charge accumulation, that is, the exposure. The image pickup signals acquired by the image pickup elements 122 and 123 are outputted to the CDS/AMPs 124 and 125 on the basis of a drive pulse supplied from each of the TGs 148 and 149.

The CDS/AMPs 124 and 125 perform a correlated double sampling process on the image signals outputted from the image pickup elements 122 and 123, and amplify the image signals to generate analog image signals of R, G, and B. The correlated double sampling process is a process of obtaining, for the purpose of reducing noise (in particular, thermal noise) contained in the output signals from the image pickup elements, a difference between a feed-through component level and a pixel signal component level which are contained in the output signal of each pixel of the image pickup elements, to thereby obtain accurate pixel data.

The A/D converters 126 and 127 convert the analog image signals of R, G, and B generated by the CDS/AMPs 124 and 125 into digital image signals.

The image input controller 128 has a built-in line buffer having a predetermined capacitance, and according to the command from the CPU 110, accumulates the image signals of one image outputted from the CDS/AMP and A/D converter unit to record the accumulated image signals into the VRAM 116.

The image signal processing device 130 includes a synchronization circuit (a processing circuit that interpolates spatial displacement of color signals due to the color filter array of a single-plate CCD, to thereby match phases of the color signals with each other), a white balance adjustment circuit, a gamma correction circuit, an outline correction circuit, a luminance and color difference signal generation circuit, and the like, and according to the command from the CPU 110, performs a required signal process on the inputted image signals, to thereby generate image data (YUV data) formed of luminance data (Y data) and color difference data (Cr, Cb data).

The compression/decompression processing device 132 performs, according to the command from the CPU 110, a compression process of a predetermined format on the inputted image data, to thereby generate compressed image data. In addition, the compression/decompression processing device 132 performs, according to the command from the CPU 110, a decompression process of a predetermined format on the inputted compressed image data, to thereby generate uncompressed image data.

The video encoder 134 controls the display on the monitor 16. That is, the video encoder 134 converts an image signal saved in the recording medium 140 into a video signal for the display on the monitor 16 (for example, an NTSC (National Television System Committee) signal, a PAL (Phase Alternating Line) signal, and an SECAM (Sequential Color with Memory) signal) to output the converted signal to the monitor 16, and outputs as needed predetermined character or figure information to the monitor 16. It should be noted that, in the case where the monitor 16 is in conformity to a digital signal, the video encoder 134 is not necessary, and a digital signal having a format which is adjusted by a signal conversion circuit (not illustrated) so as to match with the specifications of the monitor 16 is inputted to the monitor 16.

The media controller 136 records respective pieces of image data on which the compression process is performed by the compression/decompression processing device 132, into the recording medium 140.

The audio input processing device 138 receives a sound signal which is inputted from the microphone 15 and amplified by a stereo microphone amplifier (not illustrated), and performs an encoding process on the sound signal.

The recording medium 140 may include various recording media such as a semiconductor memory card typified by xD-Picture Card (registered trademark of Japan) and SD Card (registered trademark of Japan), a portable small-sized hard disk, a magnetic disc, an optical disc, and a magneto-optical disc, which are detachably attached to the compound-eye image pickup apparatus 1.

The focusing lens drive units 142 and 143 move, according to the command from the CPU 110, the focusing lenses 12b and 13b in an optical axis direction, respectively, and vary positions of focal points thereof.

The zoom lens drive units 144 and 145 move, according to the command from the CPU 110, the zoom lenses 12c and 13c in the optical axis direction, respectively, and vary positions of focal points thereof.

The diaphragm-function-provided mechanical shutters 12d and 13d are driven by iris motors of the diaphragm drive units 146 and 147, respectively, to thereby vary aperture amounts thereof, so that the amounts of light entering the image pickup elements 122 and 123 are adjusted.

The diaphragm drive units 146 and 147 vary, according to the command from the CPU 110, the aperture amounts of the diaphragm-function-provided mechanical shutters 12d and 13d, to thereby adjust the amounts of light entering the image pickup elements 122 and 123, respectively. In addition, the diaphragm drive units 146 and 147 open and close, according to the command from the CPU 110, the diaphragm-function-provided mechanical shutters 12d and 13d, to thereby expose/shield the image pickup elements 122 and 123 to/from the light, respectively.

An operation of the compound-eye image pickup apparatus 1 thus configured is described. When the barrier 11 is slid from the closed state to the opened state, the compound-eye image pickup apparatus 1 is powered on, so that the compound-eye image pickup apparatus 1 is activated in accordance with the photography mode. As the photography mode, it is possible to set the 2D photography mode and the 3D photography mode in which a stereoscopic image obtained by viewing the same subject at two points of view is photographed. The photography mode can be set from the menu screen which is displayed on the monitor 16 by pressing the MENU/OK button 25 when the compound-eye image pickup apparatus 1 is being driven in the photography mode.

The following processing is mainly performed by the CPU 50.

(1) 2D Photography Mode

The CPU 110 selects one of the right image pickup system 12 and the left image pickup system 13 (in the present embodiment, the left image pickup system 13), and causes the image pickup element 123 of the left image pickup system 13 to start the photography for a live view image. That is, images are continuously picked up by the image pickup element 123, and the image signals are continuously processed, whereby image data for a live view image is generated.

The CPU 110 sets the monitor 16 to the 2D mode, sequentially adds the generated image data to the video encoder 134, and converts the data into a signal format for display to output the result to the monitor 16. As a result, the image captured by the image pickup element 123 is through-displayed on the monitor 16. In the case where the input of the monitor 16 is in conformity to a digital signal, the video encoder 134 is not necessary, but the data needs to be converted into a signal format which matches with the input specifications of the monitor 16.

A user performs framing, checks a subject to be photographed, checks a photographed image, and sets photographing conditions while looking at the through image displayed on the monitor 16.

When the release switch 20 is half pressed in the photographing standby state described above, an S1ON signal is inputted to the CPU 110. The CPU 110 detects this input, and performs the AE photometry and the AF control. At the time of the AE photometry, the brightness of a subject is measured on the basis of an integrated value of the image signals taken in via the image pickup element 123. The measured value (photometric value) is used for deciding an aperture value and a shutter speed of the diaphragm-function-provided mechanical shutter 13d at the time of actual photographing. At the same time, it is determined on the basis of the detected subject luminance whether or not light emission of the flashlight 14 is necessary. If it is determined that the light emission of the flashlight 14 is necessary, the flashlight 14 is caused to perform preliminary light emission, and a light emission amount of the flashlight 14 at the time of actual photographing is decided on the basis of reflected light of the preliminary light emission.

In addition, at the time of the AF control, the CPU 110 performs contrast AF in which the focusing lens is sequentially moved to a lens position ranging from the nearest side to the infinite distance, the focusing evaluation value which is obtained by integrating high-frequency components of the image signal on the basis of the image signal in the AF area of the image taken in via the image pickup element 123 for each lens position is acquired from the AF detecting device 118, a lens position at which the evaluation value reaches a peak is obtained, and the focusing lens is moved to the obtained lens position.

When the release switch 20 is full pressed, an S2ON signal is inputted to the CPU 110. In response to the inputted S2ON signal, the CPU 110 executes the photography and recording process.

First, the CPU 110 drives the diaphragm-function-provided mechanical shutter 13d via the diaphragm drive unit 147 on the basis of an aperture value which is decided on the basis of the above-mentioned photometric value, and controls the electric charge accumulation time (so-called electronic shutter) in the image pickup element 123 so as to have a shutter speed decided on the basis of the above-mentioned photometric value.

On this occasion, in the case where the flashlight 14 is caused to emit light, the flashlight 14 is caused to emit light on the basis of the light emission amount of the flashlight 14 which is obtained by the result of the preliminary light emission.

The subject light enters the light receiving surface of the image pickup element 123 via the focusing lens 13b, the zoom lens 13c, the diaphragm-function-provided mechanical shutter 13d, an infrared ray cut filter 46, an optical low-pass filter 48, and the like.

The signal electric charges accumulated in each photodiode of the image pickup element 123 are read out in accordance with a timing signal added from the TG 149, and are sequentially outputted from the image pickup element 123 as a voltage signal (image signal) to be inputted to the CDS/AMP 125.

The CDS/AMP 125 performs the correlated double sampling process on a CCD output signal on the basis of a CDS pulse, and amplifies the image signal outputted from a CDS circuit by a gain for setting photographic sensitivity added from the CPU 110.

The analog image signal outputted from the CDS/AMP 125 is converted into a digital image signal by the A/D converter 127, and the converted image signal (RAW data of R, G, and B) is transferred to the SDRAM 114 to be temporarily stored therein.

The image signals of R, G, and B read out from the SDRAM 114 are inputted to the image signal processing device 130. In the image signal processing device 130, the white balance adjustment circuit performs white balance adjustment by applying a digital gain to each of the image signals of R, G, and B, the gamma correction circuit performs a gradation conversion process according to gamma characteristics, and a synchronization process of interpolating the spatial displacement of the respective color signals due to the color filter array of the single-plate CCD, to thereby match the phases of the color signals with each other, is performed. The synchronized (interpolated) image signals of R, G, and B are further converted into a luminance signal Y and a color difference signal Cr, Cb (YC signal) by the luminance and color difference signal generation circuit, and the Y signal is subjected to an outline emphasis process by the outline correction circuit. The YC signal which has been processed by the image signal processing device 130 is stored in the SDRAM 114 again.

The YC signal stored in the SDRAM 114 as described above is compressed by the compression/decompression processing device 132, and is recorded in the recording medium 140 via the media controller 136 as an image file having a predetermined format. The data of a still image is stored in the recording medium 140 as an image file conforming to the Exif (Exchangeable image file format) standard. The Exif file has a region for storing the data of a main image and a region for storing the data of a reduced image (thumbnail image). The data of the main image acquired by photographing is subjected to a pixel thinning-out process and other necessary data processes, with the result that the thumbnail image having a prescribed size (for example, 160×120 or 80×60 pixels) is generated. The thumbnail image thus generated is written into the Exif file together with the main image. In addition, the Exif file has tag information attached thereto, such as photographing date and time, photographing conditions, and face detection information.

(2) 3D Photography Mode

The CPU 110 causes the image pickup element 122 and the image pickup element 123 to start the photography for a live view image. That is, images of the same subject are continuously picked up by the image pickup element 122 and the image pickup element 123, and the image signals are continuously processed, whereby stereoscopic image data for a live view image is generated. The CPU 110 sets the monitor 16 to the 3D mode, and respective pieces of the generated image data are sequentially converted into a signal format for display by the video encoder 134 to be outputted to the monitor 16.

Respective pieces of the generated image data are sequentially added to the video encoder 134 and are converted into a signal format for display to be outputted to the monitor 16. As a result, the stereoscopic image data for a live view image is through-displayed on the monitor 16.

A user can perform framing (adjusting a field angle), check a subject to be photographed, check a photographed image, and set photographing conditions while looking at the through image displayed on the monitor 16.

When the release switch 20 is half pressed in the photographing standby state described above, the S1ON signal is inputted to the CPU 110. The CPU 110 detects the S1ON signal, and performs the AE photometry and the AF control. The AE photometry is performed by any one of the right image pickup system 12 and the left image pickup system 13 (in the present embodiment, the left image pickup system 13). In addition, the AF control is performed by each of the right image pickup system 12 and the left image pickup system 13. The AE photometry is performed in the same manner as in the 2D photography mode, and hence detailed description thereof is omitted.

Figure 3:
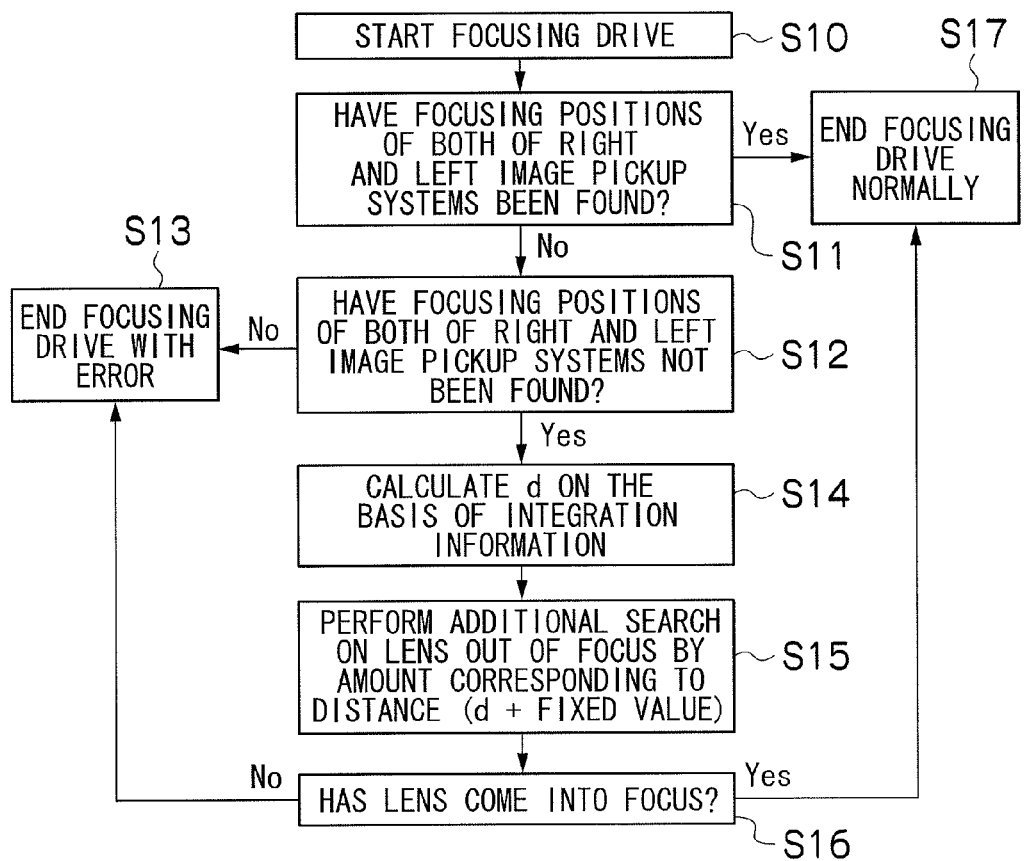
FIG. 3 is a flowchart illustrating a processing flow of AF control in a 3D photography mode of the compound-eye image pickup apparatus according to the first embodiment.

FIG. 3 is a flowchart illustrating a processing flow of the AF control in the 3D photography mode. In response to the half press (S1ON) of the release switch, the CPU 110 starts the focusing drive (Step S10).

That is, the CPU 110 controls the focusing lens drive units 142 and 143 to move the positions of the focusing lenses 12b and 13b to the initial positions, respectively. The CPU 110 moves the focusing lenses 12b and 13b on a predetermined unit basis (for example, each unit obtained when the search range is equally divided into 50 stages) by a stepwise drive within the search range for focusing (from the MOD to the infinite distance). The moving direction of the focusing lenses 12b and 13b may be from the telephoto side to the nearest side or may be from the nearest side to the telephoto side.

Figure 4:
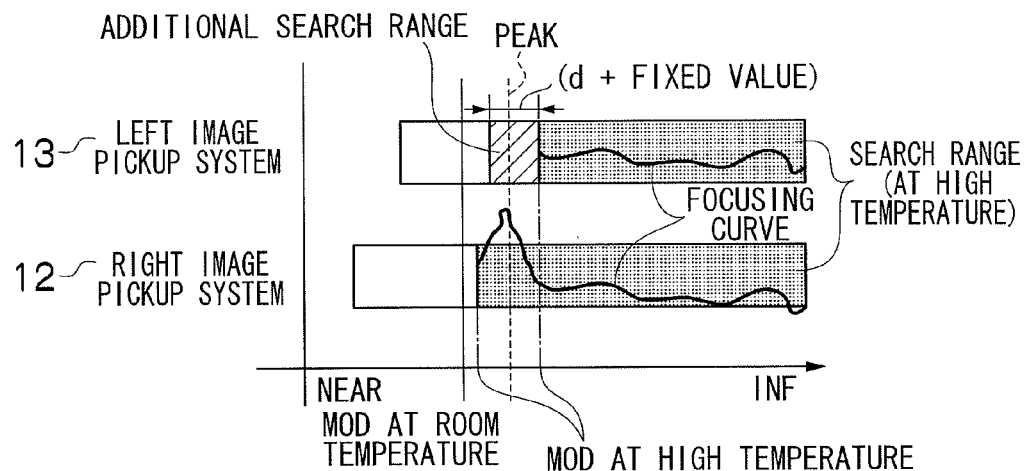
FIG. 4 is a schematic graph illustrating a search range of the compound-eye image pickup apparatus according to the first embodiment.

FIG. 4 is a schematic graph illustrating a search range when a user uses the compound-eye image pickup apparatus 1 at temperature which is higher (hereinafter, referred to as high temperature) than the temperature at the time of shipment from a factory (hereinafter, referred to as room temperature). The compound-eye image pickup apparatus 1 is adjusted so that the MODs (the MODs at room temperature) of the right image pickup system 12 and the left image pickup system 13 coincide with each other at room temperature, but due to a change in dimensions of a lens or a lens barrel, the MODs of the right image pickup system 12 and the left image pickup system 13 change depending on the temperature. Different lens barrels and different focusing lenses are used between the right image pickup system 12 and the left image pickup system 13, and hence the MODs (the MODs at high temperature) of the right image pickup system 12 and the left image pickup system 13 are different from each other at high temperature. Accordingly, the search ranges of the focusing lenses 12b and 13b fall within different ranges.

The CPU 110 acquires image data via the image pickup elements 122 and 123 each time the stepwise drive is performed on a predetermined unit basis. The AF detecting device 118 calculates the focusing evaluation value indicating the sharpness of a subject image on the basis of a part of the acquired image data within a predetermined area (for example, a rectangular region in the vicinity of a screen center).

The AF detecting device 118 obtains a focusing curve indicating a relation between each lens position and the corresponding focusing evaluation value on the basis of the focusing evaluation values calculated at all the focusing lens positions. The CPU 110 determines whether or not it is possible to detect the positions of local maximum points (peaks) in the focusing curves of both of the right image pickup system 12 and the left image pickup system 13, that is, determines whether or not the focusing positions of both of the right and left image pickup systems have been found (Step S11). As illustrated in FIG. 4, because an object to be photographed by the right image pickup system 12 and the left image pickup system 13 is the same subject, if the positions of the focusing lenses are the same, the focusing evaluation values thereof are substantially the same. That is, in the case where the positions of the focusing lenses are made incident with each other, the focusing curves of the right image pickup system 12 and the left image pickup system 13 are substantially the same. In this case, it is possible to detect the peak from the focusing curve of the right image pickup system 12. However, the position of the focusing lens 12b at which the peak has been detected is out of the search range of the left image pickup system 13, and hence the peak cannot be detected from the focusing curve of the left image pickup system 13. Accordingly, in this case, it is determined in Step S11 that the focusing position of any one of the right and left image pickup systems has been found.

If the focusing positions of both of the right and left image pickup systems have been found (YES in Step S11), this means that the AF process has been performed normally, and hence the AF control process is ended (Step S17).

If the focusing positions of the right and left image pickup systems have not both been found (No in Step S11), it is determined whether the focusing positions of both of the right and left image pickup systems have not been found (Step S12). If the focusing positions of both of the right and left image pickup systems have not been found (No in Step S12), this means that the focusing positions thereof are not detected, and hence it is understood that the AF process has not been performed normally, so that the AF control process is ended (Step S13). At this time, the CPU 110 displays on the monitor 16 an error display to the effect that the AF control has been failed.

Figure 5:
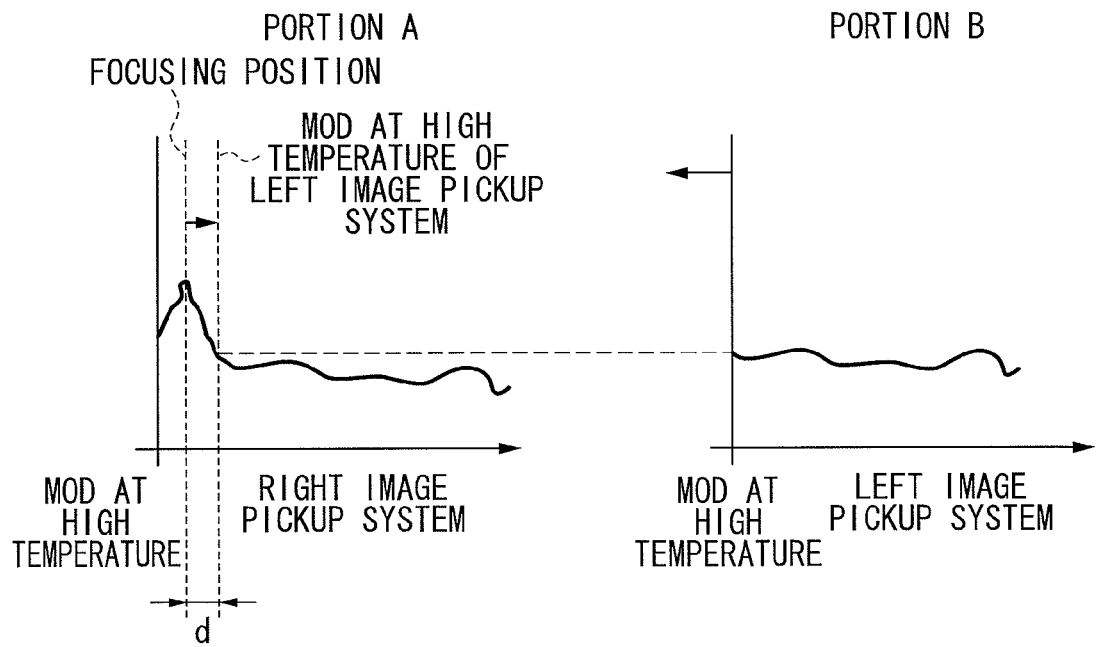
FIG. 5 is a graph for describing a calculation method for an additional search range.

If the focusing position of any one of the right and left image pickup systems has been found (Yes in Step S12), this means that the focusing position of any one of the right and left image pickup systems cannot be found due to the change in search range caused by temperature. Accordingly, the CPU 110 calculates a distance d by which the focusing lens is moved in order to detect the focusing position of the image pickup system whose focusing position has not been found, on the basis of the focusing curve of the right image pickup system 12 and the focusing curve of the left image pickup system 13 (Step S14). In the case where the positions of the focusing lenses are made incident with each other, the focusing curves of the right image pickup system 12 and the left image pickup system 13 become substantially the same. Therefore, as illustrated in FIG. 5, the focusing curve of the right image pickup system 12 (PORTION A of FIG. 5) and the focusing curve of the left image pickup system 13 (PORTION B of FIG. 5) are laid on top of each other, to thereby examine to which point of the focusing curve of the right image pickup system 12 whose peak has been detected the focusing curve of the left image pickup system 13 whose peak has not been detected corresponds. Then, the CPU 110 calculates as the distance d the difference between the position of the MOD at high temperature of the left image pickup system 13 and the focusing position of the right image pickup system 12.

The CPU 110 sets, as an additional search range, a range between the MOD and a position which is located on the nearest side by the distance (d+(a fixed value)) with respect to the MOD, uses the same method as that in Step S11 to perform the focusing operation on the focusing lens of the image pickup system whose focusing position has not been detected, and thus obtains the focusing curve (Step S15). In the case illustrated in FIG. 4, the CPU 110 repeatedly performs a process of moving the focusing lens 13b on a predetermined unit basis by a stepwise drive within the additional search range, acquiring image data, and calculating the focusing evaluation value, to thereby obtain the focusing curve for the additional search range. The moving direction of the focusing lens 13b may be from the telephoto side to the nearest side or may be from the nearest side to the telephoto side. It should be noted that the fixed value is added to the distance d in Step S15 in order to prevent the peak of the focusing curve from not being detected due to an error, but the addition of the fixed value is not essential.

The CPU 110 determines whether or not the peak of the image pickup system whose focusing position has not been detected in Step S12 has been detected by the additional search performed in Step S15, that is, whether or not the focusing position thereof has been detected (Step S16). If the focusing position thereof has been detected (YES in Step S16), it is understood that the AF process has been performed normally, so that the AF control process is ended (Step S17). If the focusing position thereof has not been detected (No in Step S16), it is understood that the AF process has not been performed normally, so that the AF process is ended (Step S13). In this way, even in the case where the focusing position of any one of the right and left image pickup systems is not detected by a normal AF process due to the individual variability in image pickup system, it is possible to detect the focusing positions of both of the right and left image pickup systems.

When the release switch 20 is full pressed, the S2ON signal is inputted to the CPU 110. In response to the inputted S2ON signal, the CPU 110 executes the photography and recording process. A process of generating the image data which is photographed by each of the right image pickup system 12 and the left image pickup system 13 is the same as in the 2D photography mode, and hence description thereof is omitted.

Two pieces of compressed image data are generated by the same method as in the 2D photography mode from the two pieces of image data generated by the CDS/AMPs 124 and 125. The two pieces of compressed image data are recorded into the recording medium 140 in association with each other.

When the mode of the compound-eye image pickup apparatus 1 is set to a reproduction mode, the CPU 110 outputs the command to the media controller 136, and causes the media controller 136 to read out an image file which is last recorded into the recording medium 140.

The compressed image data in the read-out image file is supplied to the compression/decompression processing device 132 to be decompressed into an uncompressed luminance/color difference signal, is changed into a stereoscopic image by the stereoscopic image signal processing unit 133, and then is outputted onto the monitor 16 via the video encoder 134. As a result, the image recorded in the recording medium 140 is reproduced and displayed on the monitor 16 (reproduction of one image).

In the reproduction of one image, an image photographed in the 2D photography mode is displayed in the 2D mode on an entire screen of the monitor 16, an image photographed in a tele/wide simultaneous photography mode is displayed as a tele-side image and a wide-side image which are arranged side by side, and an image photographed in the 3D photography mode is displayed in the 3D mode on the entire screen of the monitor 16.

The frame-by-frame playback of an image is performed by operating the right and left keys of the cross button 26. When the right key of the cross button 26 is pressed, the next image file is read out from the recording medium 140, and is reproduced and displayed on the monitor 16. On the other hand, when the left key of the cross button is pressed, the previous image file is read out from the recording medium 140, and is reproduced and displayed on the monitor 16. It is possible to erase an image recorded in the recording medium 140 as needed while checking the image reproduced and displayed on the monitor 16. The erasure of an image is performed by pressing the MENU/OK button 25 in the state where the image is reproduced and displayed on the monitor 16.

According to the present embodiment, even in the case where the focusing position of any one of the right and left image pickup systems is not detected by the normal AF process due to the individual variability in image pickup system, it is possible to detect the focusing positions of both of the right and left image pickup systems.

In addition, according to the present embodiment, the additional search range is decided on the basis of the focusing evaluation value. Therefore, even in the case where the focusing position is not detected in the first search (Step S11), the focusing position can reliably be detected in the additional search (Step S15).

Figure 6:
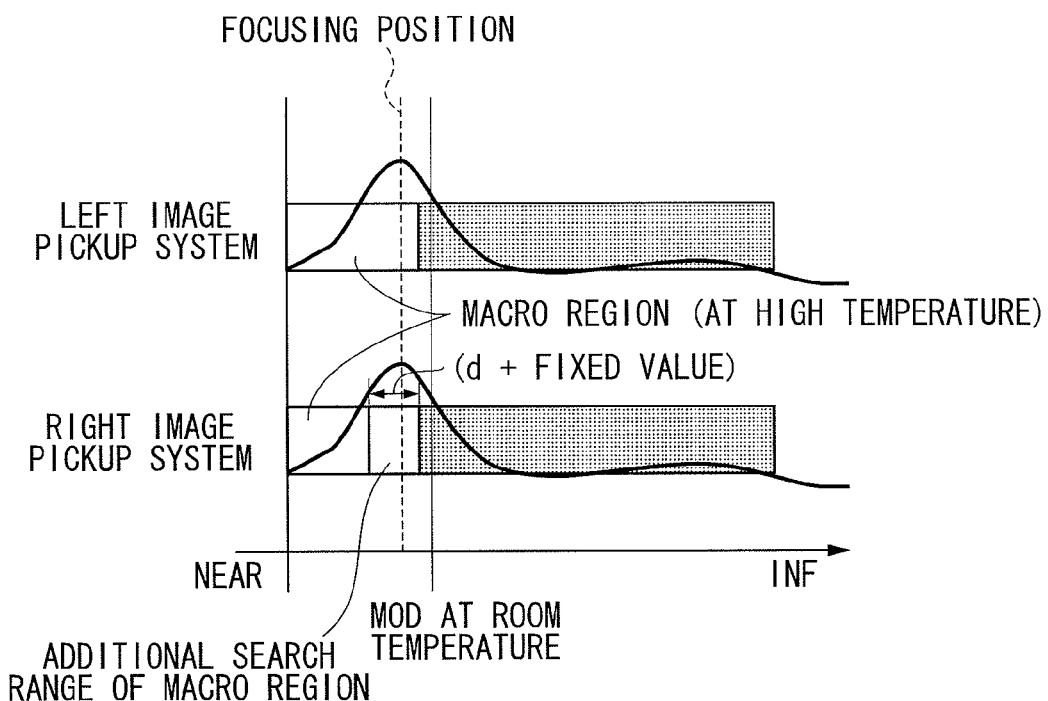
FIG. 6 is a schematic graph illustrating a search range of a macro region of the compound-eye image pickup apparatus according to the first embodiment.
Figure 7:
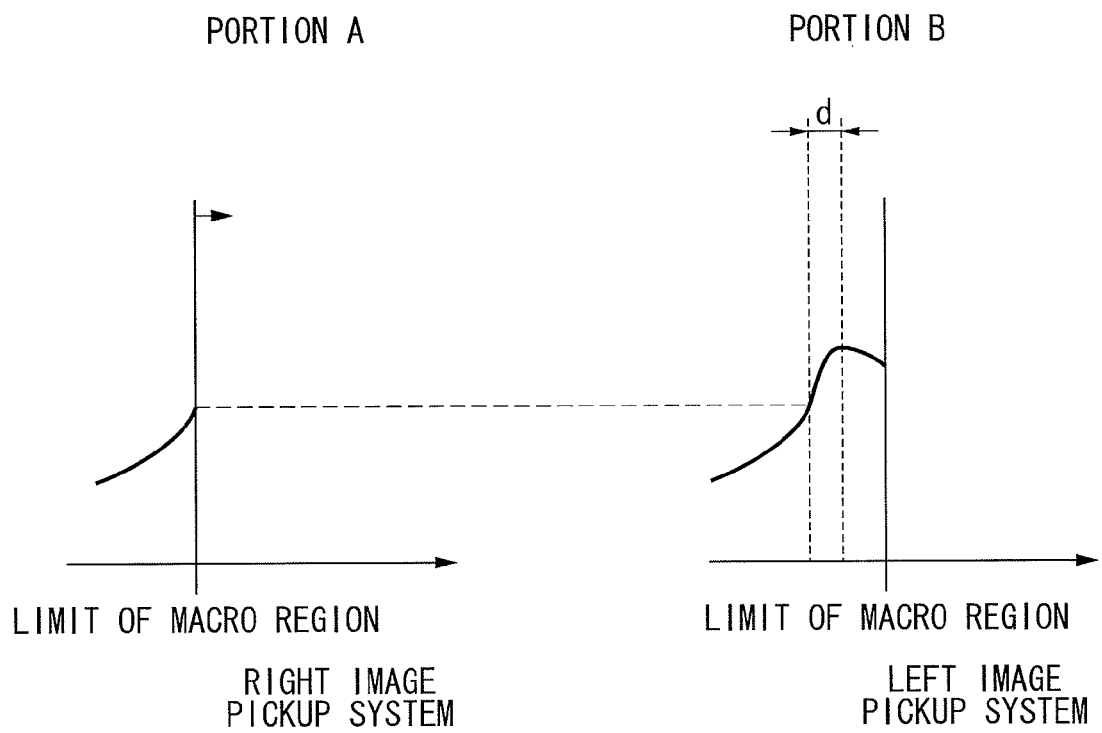
FIG. 7 is a graph for describing a calculation method for an additional search range of the macro region.

It should be noted that, in the present embodiment, description is given by taking as an example the case where the focusing position of one of the image pickup systems is not detected when the AF control is performed with a range between the MOD and the infinite distance being set as the search range, but the similar processing is possible also in a macro region. FIG. 6 illustrates a case where the focusing position of the left image pickup system 13 is detected in the macro region while the focusing position of the right image pickup system 12 is not detected in the macro region. In this case, as illustrated in FIG. 7, the focusing curve of the right image pickup system 12 and the focusing curve of the left image pickup system 13 are laid on top of each other, to thereby calculate the distance d. Then, the search range of the macro region is widened toward the telephoto side by the distance d, which makes it possible to detect the focusing position of the right image pickup system 12.

Second Embodiment

According to the first embodiment of the presently disclosed subject matter, in the case where the focusing position of any one of the right and left image pickup systems is not detected by the normal AF process, the additional search range is calculated on the basis of the focusing curve, but a method of calculating the additional search range is not limited thereto.

According to a second embodiment of the presently disclosed subject matter, the additional search range is calculated on the basis of the change amount of a search range due to a change in temperature. Hereinafter, a compound-eye image pickup apparatus 2 of the second embodiment is described. It should be noted that the same components as those in the first embodiment are designated by the same reference numerals and characters, and description thereof is omitted.

Figure 8:
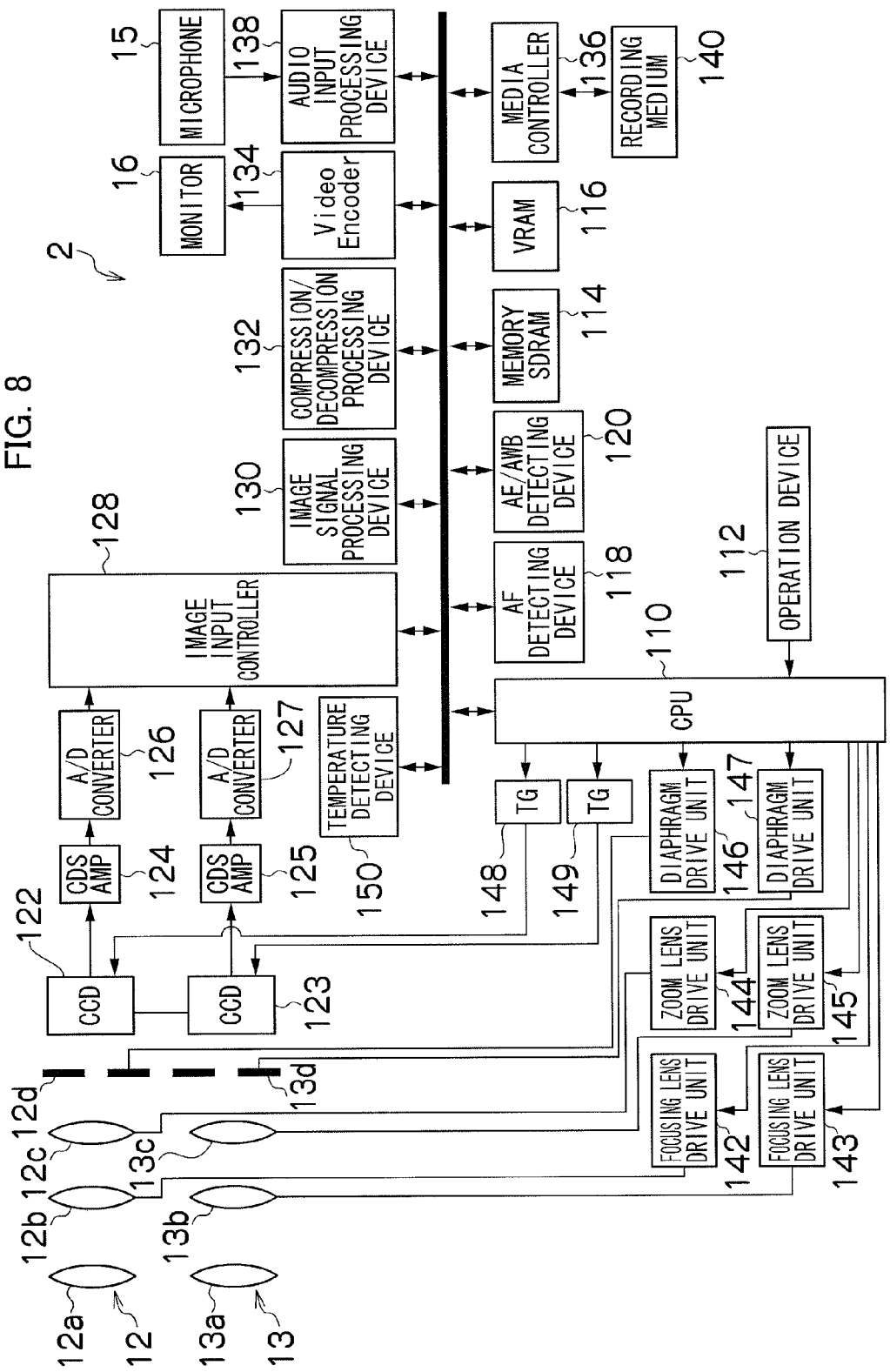
FIG. 8 is a block diagram illustrating an electrical configuration of a compound-eye image pickup apparatus according to a second embodiment of the presently disclosed subject matter.

FIG. 8 is a block diagram illustrating a main internal configuration of the compound-eye image pickup apparatus 2. The compound-eye image pickup apparatus 2 includes the CPU 110, the operation device (the release switch 20, the MENU/OK button 25, the cross button 26, and the like) 112, the SDRAM 114, the VRAM 116, the AF detecting device 118, the AE/AWB detecting device 120, the image pickup elements 122 and 123, the CDS/AMPs 124 and 125, the A/D converters 126 and 127, the image input controller 128, the image signal processing device 130, the stereoscopic image signal processing unit 133, the compression/decompression processing device 132, the video encoder 134, the media controller 136, the audio input processing device 138, the recording medium 140, the focusing lens drive units 142 and 143, the zoom lens drive units 144 and 145, the diaphragm drive units 146 and 147, the timing generators (TGs) 148 and 149, and a temperature detecting device 150.

The temperature detecting device 150 detects a temperature of each of the right image pickup system 12 and the left image pickup system 13, and is provided on a surface of the lens barrel of the right image pickup system 12. The temperature of the left image pickup system 13 is not directly measured, but the right image pickup system 12 and the left image pickup system 13 are provided in proximity to each other within the compound-eye image pickup apparatus 2, and hence it can be estimated that the temperature of the right image pickup system 12 and the temperature of the left image pickup system 13 are the same. Accordingly, the temperature detected by the temperature detecting device 150 may be considered as the temperature of both of the right image pickup system 12 and the left image pickup system 13. It should be noted that, in the present embodiment, the number of the temperature detecting device 150 is one, and the temperature detecting device 150 is provided on the surface of the lens barrel of the right image pickup system 12, but the number and the placement position of the temperature detecting device 150 are not limited thereto. For example, two temperature detecting devices 150 may be prepared to be provided in the lens barrel of the right image pickup system 12 and the lens barrel of the left image pickup system 13, respectively. Alternatively, one temperature detecting device 150 may be prepared to be provided in the camera body 10. In this case, it is desirable that the temperature detecting device 150 be located at a position as close to the right image pickup system 12 and the left image pickup system 13 as possible and in the vicinity of a middle point between the right image pickup system 12 and the left image pickup system 13.

An operation of the compound-eye image pickup apparatus 2 thus configured is described. In the operation of the compound-eye image pickup apparatus 2, only the processing of the AF control in the 3D photography mode is different from that of the compound-eye image pickup apparatus 1, and hence description is given below only of the processing of the AF control in the 3D photography mode.

Figure 9:
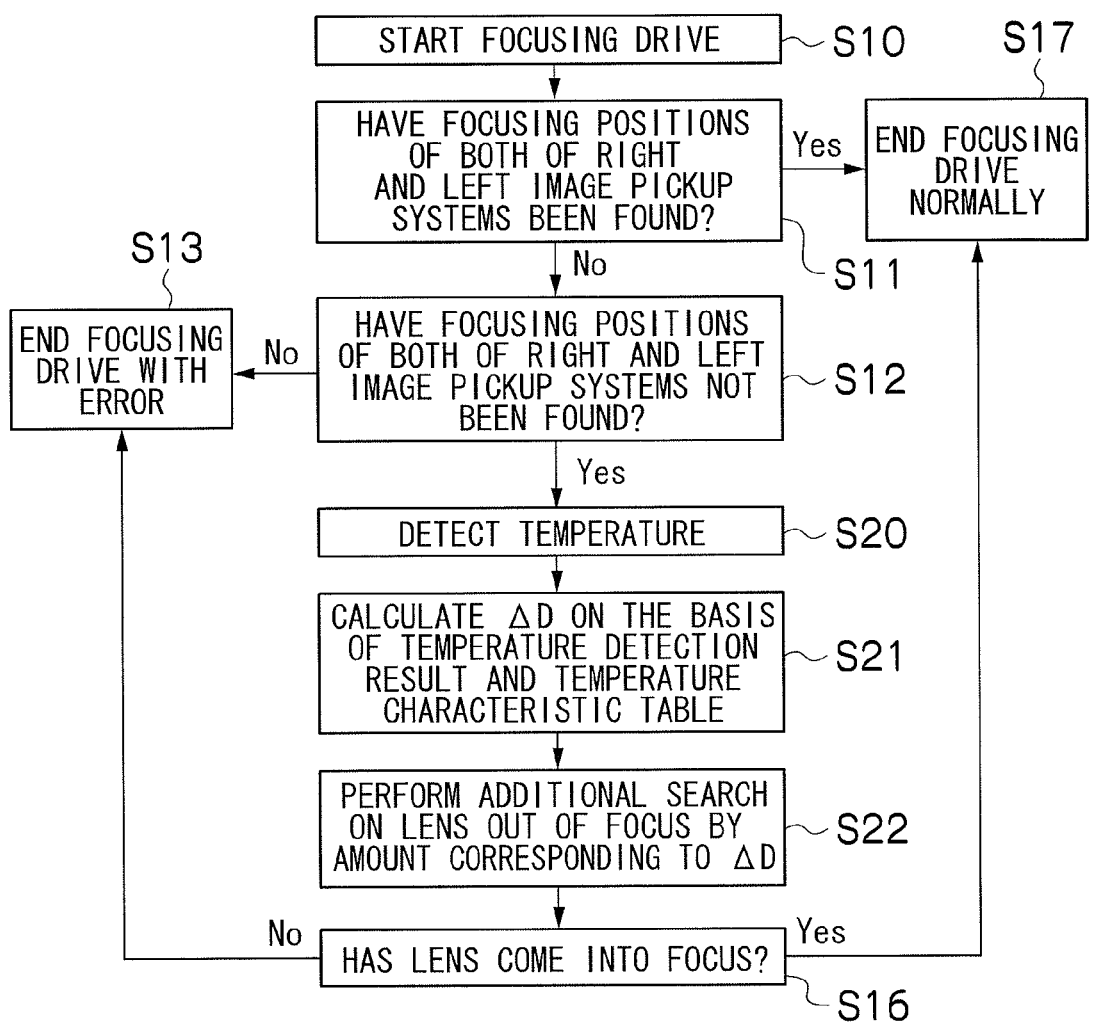
FIG. 9 is a flowchart illustrating a processing flow of AF control in a 3D photography mode of the compound-eye image pickup apparatus according to the second embodiment.

FIG. 9 is a flowchart illustrating a processing flow of the AF control in the 3D photography mode of the compound-eye image pickup apparatus 2.

In response to the half press of the release switch, the CPU 110 starts the focusing drive (Step S10). The AF detecting device 118 acquires image data at all the focusing lens positions within the search range, and calculates the focusing evaluation value indicating the sharpness of a subject image on the basis of each image data. The AF detecting device 118 obtains the focusing curve indicating the relation between each lens position and the corresponding focusing evaluation value on the basis of the calculated focusing evaluation values. The CPU 110 determines whether or not it is possible to detect the positions of local maximum points (peaks) in the focusing curves of both of the right image pickup system 12 and the left image pickup system 13, that is, determines whether or not the focusing positions of both of the right and left image pickup systems have been found (Step S11).

If the focusing positions of both of the right and left image pickup systems have been found (YES in Step S11), this means that the AF process has been performed normally, and hence the AF control process is ended (Step S17).

If the focusing positions of the right and left image pickup systems have not both been found (No in Step S11), it is determined whether the focusing positions of both of the right and left image pickup systems have not been found (Step S12). If the focusing positions of both of the right and left image pickup systems have not been found (NO in Step S12), this means that the focusing positions thereof are not detected, and hence it is understood that the AF process has not been performed normally, so that the AF control process is ended (Step S13). At this time, the CPU 110 displays on the monitor 16 an error display to the effect that the AF control has been failed.

If the focusing position of any one of the right and left image pickup systems has been found (YES in Step S12), this means that the focusing position of any one of the right and left image pickup systems cannot be found due to the change in search range caused by temperature. Accordingly, the CPU 110 acquires the temperature detected by the temperature detecting device 150 (Step S20), and then acquires the additional search range from a temperature characteristic table (see FIG. 10) (Step S21).

Figure 10:
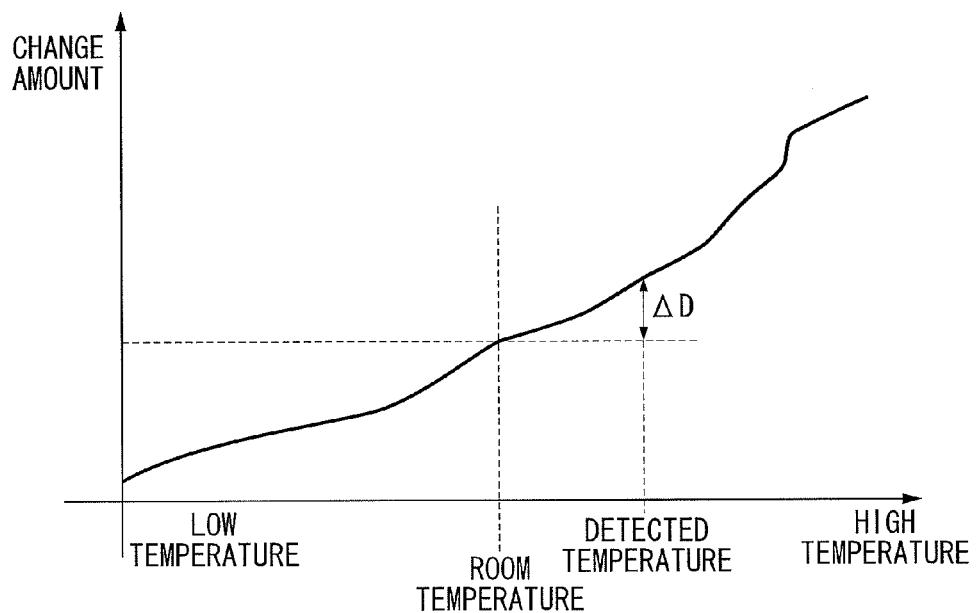
FIG. 10 is a graph illustrating a temperature characteristic table of the compound-eye image pickup apparatus according to the second embodiment.

As illustrated in FIG. 10, the temperature characteristic table is a graph illustrating a relation between the temperature and the change amount of the search range, and is used for correcting the difference in search range caused by the individual variability between the right and left image pickup systems. The temperature characteristic table is stored in advance in the SDRAM 114. The change amount of the search range refers to the change amount of the search range when the search range at room temperature is used as a reference. The change amount of the search range is a maximum value when the individual variability is taken into consideration. Further, a plurality of samples are used to measure the search range while changing the temperature, and on the basis of the measurement data thus obtained, the change amount of the search range is obtained for each temperature at which the measurement is performed.

In Step S21, the CPU 110 acquires, as the additional search range, a change amount ΔD of the search range at the temperature detected in Step S20, from the temperature characteristic table. That is, the CPU 110 sets, as the additional search range, a range between the MOD and a position which is located on the nearest side by the change amount ΔD with respect to the MOD.

Then, the CPU 110 uses the same method as that in Step S11 to perform the focusing operation on the focusing lens of the image pickup system whose focusing position has not been detected, in the state where the range between the MOD and the position which is located on the nearest side by the change amount AD with respect to the MOD is set as the additional search range, and thus obtains the focusing curve (Step S22). In the case illustrated in FIG. 11, the focusing position of the left image pickup system 13 is not detected. Accordingly, the CPU 110 repeatedly performs a process of moving the focusing lens 13b toward the nearest side on a predetermined unit basis by a stepwise drive within the additional search range, acquiring image data, and calculating the focusing evaluation value, to thereby obtain the focusing curve for the additional search range and detect the peak. It should be noted that the fixed value is added to the distance d in the first embodiment, whereas the fixed value is not added in the present embodiment. This is because the change amount ΔD contains an error tolerance value, that is, a change amount Δd1 of the search range of the right image pickup system 12 and a change amount Δd2 of the search range of the left image pickup system 13 are both smaller than the change amount ΔD.

The CPU 110 determines whether or not the focusing position of the image pickup system whose focusing position has not been detected in Step S12 has been detected by the additional search performed in Step S22 (Step S16). If the focusing position thereof has been detected (YES in Step S16), it is understood that the AF process has been performed normally, so that the AF control process is ended (Step S17). If the focusing position thereof has not been detected (No in Step S16), it is understood that the AF process has not been performed normally, so that the AF process is ended (Step S13).

According to the present embodiment, even in the case where the focusing position of any one of the right and left image pickup systems is not detected by the normal AF process due to the individual variability in image pickup system, it is possible to detect the focusing positions of both of the right and left image pickup systems.

In addition, the additional search range is decided on the basis of the temperature characteristic table stored in advance. Therefore, the additional search range can be decided by simple processing.

Figure 12:
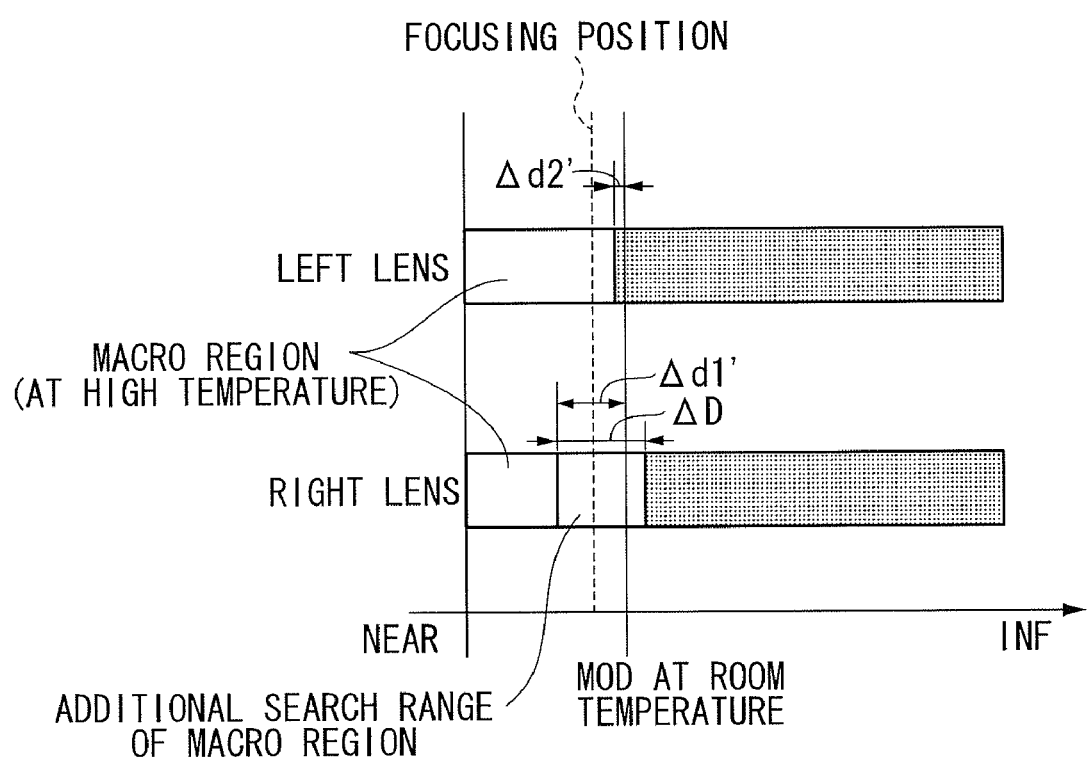
FIG. 12 is a schematic graph illustrating a search range of a macro region of the compound-eye image pickup apparatus according to the second embodiment.

It should be noted that, in the present embodiment, description is given by taking as an example the case where the focusing position of one of the image pickup systems is not detected when the AF control is performed with a range between the MOD and the infinite distance being set as the search range, but the similar processing is possible also in a macro region. FIG. 12 illustrates a case where the focusing position of the left image pickup system 13 is detected in the macro region while the focusing position of the right image pickup system 12 is not detected in the macro region. In this case, the change amount ΔD of the search range at the temperature detected by the temperature detecting device 150 is obtained from the temperature characteristic table illustrated in FIG. 10, a range which is widened toward the telephoto side by the change amount ΔD of the search range is set as the additional search range of the macro region, and the additional search is performed within the additional search range for the right image pickup system 12 whose focusing position has not been detected, which makes it possible to detect the focusing position of the right image pickup system 12.

Third Embodiment

According to the second embodiment of the presently disclosed subject matter, in the case where the focusing position of any one of the right and left image pickup systems is not detected by the normal AF process, the additional search is performed on the basis of the maximum value ΔD of the change amount of the search range due to the change in temperature, but the additional search range is not limited to ΔD.

According to a third embodiment of the presently disclosed subject matter, the additional search is performed on the basis of a difference ΔD' between a maximum value and a minimum value of the change amount of the search range due to the change in temperature. Hereinafter, a compound-eye image pickup apparatus 3 of the third embodiment is described. It should be noted that the configuration of the compound-eye image pickup apparatus 3 is the same as that of the compound-eye image pickup apparatus 2, and hence description thereof is omitted. In addition, the same components as those in the first embodiment and the second embodiment are designated by the same reference numerals and characters, and description thereof is omitted.

An operation of the compound-eye image pickup apparatus 3 thus configured is described. In the operation of the compound-eye image pickup apparatus 3, only the processing of the AF control in the 3D photography mode is different from that of the compound-eye image pickup apparatuses 1 and 2, and hence description is given below only of the processing of the AF control in the 3D photography mode.

Figure 13:
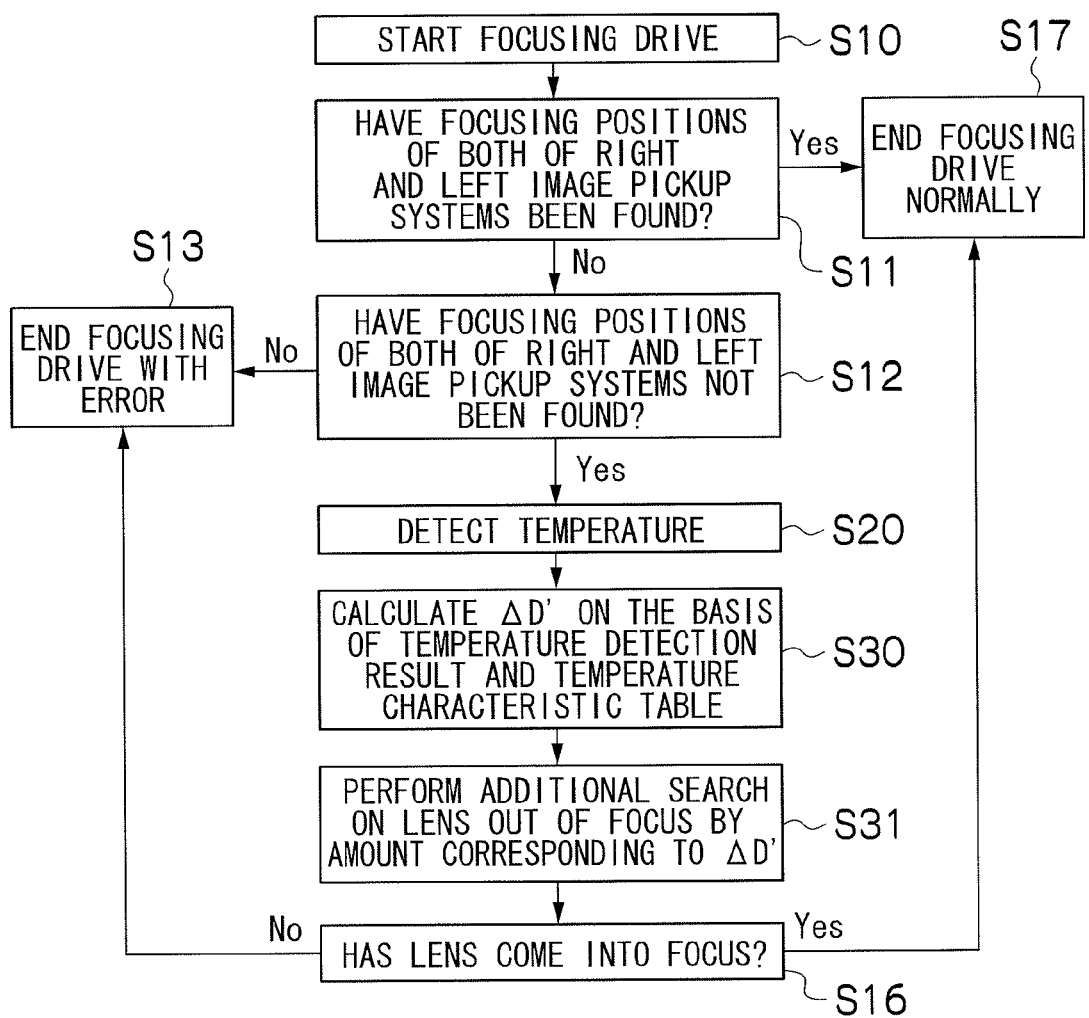
FIG. 13 is a flowchart illustrating a processing flow of AF control in a 3D photography mode of a compound-eye image pickup apparatus according to a third embodiment of the presently disclosed subject matter.

FIG. 13 is a flowchart illustrating a processing flow of the AF control in the 3D photography mode of the compound-eye image pickup apparatus 3.

In response to the half press of the release switch, the CPU 110 starts the focusing drive (Step S10). The AF detecting device 118 acquires image data at all the focusing lens positions within the search range, and calculates the focusing evaluation value indicating the sharpness of a subject image on the basis of each image data. The AF detecting device 118 obtains the focusing curve indicating the relation between each lens position and the corresponding focusing evaluation value on the basis of the calculated focusing evaluation values. The CPU 110 determines whether or not it is possible to detect the positions of local maximum points (peaks) in the focusing curves of both of the right image pickup system 12 and the left image pickup system 13, that is, determines whether or not the focusing positions of both of the right and left image pickup systems have been found (Step S11).

If the focusing positions of both of the right and left image pickup systems have been found (YES in Step S11), this means that the AF process has been performed normally, and hence the AF control process is ended (Step S17).

If the focusing positions of the right and left image pickup systems have not both been found (No in Step S11), it is determined whether the focusing positions of both of the right and left image pickup systems have not been found (Step S12). If the focusing positions of both of the right and left image pickup systems have not been found (NO in Step S12), this means that the focusing positions thereof are not detected, and hence it is understood that the AF process has not been performed normally, so that the AF control process is ended (Step S13). At this time, the CPU 110 displays on the monitor 16 an error display to the effect that the AF control has been failed.

If the focusing position of any one of the right and left image pickup systems has been found (YES in Step S12), this means that the focusing position of any one of the right and left image pickup systems cannot be found due to the change in search range caused by temperature. Accordingly, the CPU 110 acquires the temperature detected by the temperature detecting device 150 (Step S20), and then acquires the additional search range ΔD' from a temperature characteristic table (see FIG. 14) (Step S30).

Figure 14:
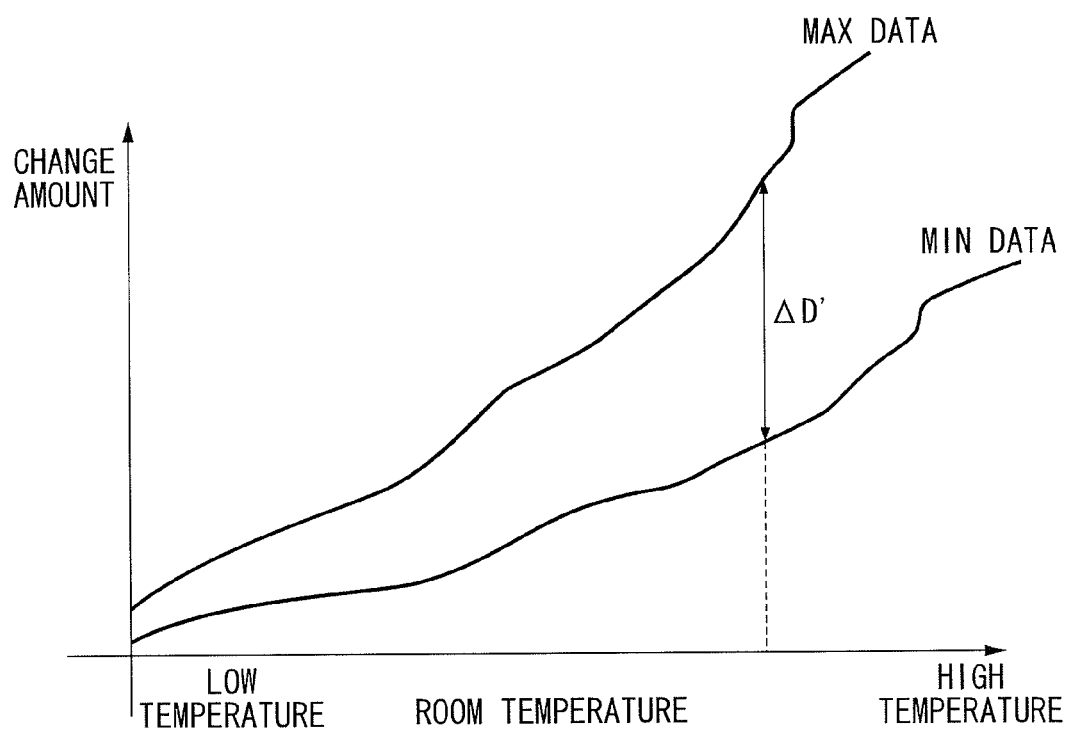
FIG. 14 is a graph illustrating a temperature characteristic table of the compound-eye image pickup apparatus according to the third embodiment.
Figure 15A:
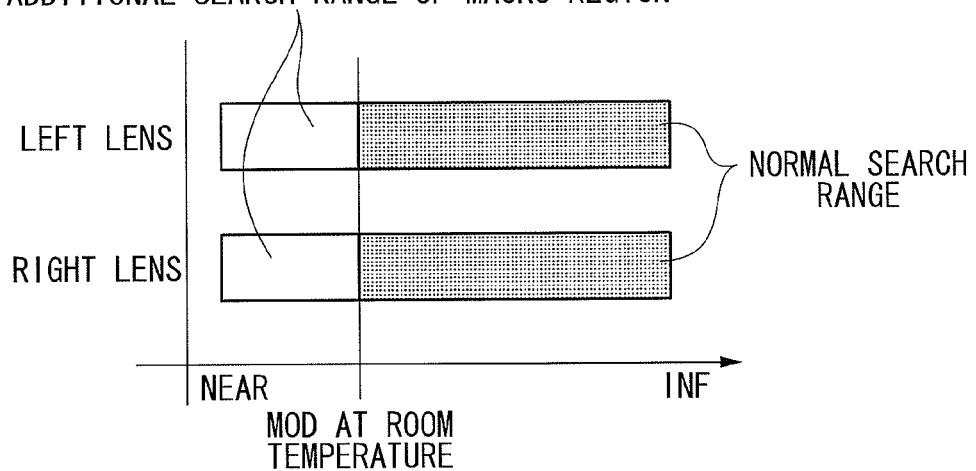
FIGS. 15A and 15B are graphs for describing problems to be solved by the presently disclosed subject matter.
Figure 15B:
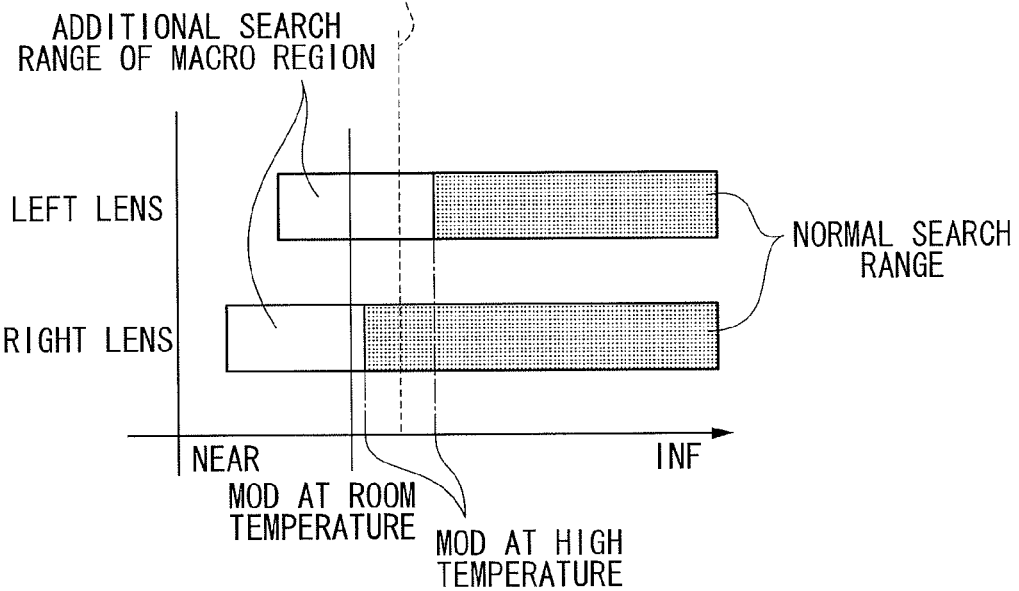

In the present embodiment, as illustrated in FIG. 14, the SDRAM 114 stores therein the temperature characteristic table illustrating a relation between the temperature and the maximum value when the individual variability of the change amount of the search range is taken into consideration and a relation between the temperature and the minimum value when the individual variability of the change amount of the search range is taken into consideration. A plurality of samples are used to measure the search range while changing the temperature, and on the basis of the measurement data thus obtained, the maximum value and the minimum value when the individual variability of the change amount of the search range is taken into consideration are obtained for each temperature at which the measurement is performed.

In Step S30, the CPU 110 acquires the difference ΔD' between the maximum value and the minimum value of the change amount of the search range at the temperature detected in Step S20, from the temperature characteristic table.

Figure 11:
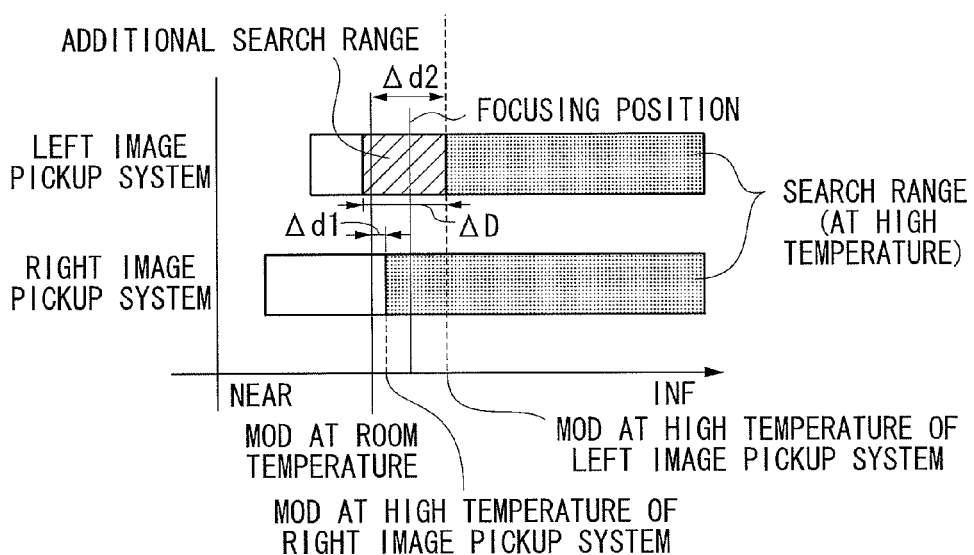
FIG. 11 is a schematic graph illustrating a search range of the compound-eye image pickup apparatus according to the second embodiment.

Then, the CPU 110 sets, as the additional search range, a range between the MOD and a position which is located on the nearest side by the difference ΔD' with respect to the MOD, uses the same method as that in Step S11 to perform the focusing operation on the focusing lens of the image pickup system whose focusing position has not been detected, and thus obtains the focusing curve (Step S31). In the case as illustrated in FIG. 11 in which the focusing position of the left image pickup system 13 is not detected, the CPU 110 repeatedly performs a process of moving the focusing lens 13b toward the nearest side on a predetermined unit basis by a stepwise drive within the additional search range, acquiring image data, and calculating the focusing evaluation value, to thereby obtain the focusing curve for the additional search range and detect the peak.

The CPU 110 determines whether or not the focusing position of the image pickup system whose focusing position has not been detected in Step S12 has been detected by the additional search performed in Step S31 (Step S16). If the focusing position thereof has been detected (YES in Step S16), it is understood that the AF process has been performed normally, so that the AF control process is ended (Step S17). If the focusing position thereof has not been detected (No in Step S16), it is understood that the AF process has not been performed normally, so that the AF process is ended (Step S13).

According to the present embodiment, even in the case where the focusing position of any one of the right and left image pickup systems is not detected by the normal AF process due to the individual variability in image pickup system, it is possible to detect the focusing positions of both of the right and left image pickup systems. In addition, the range to be additionally searched is set to the difference ΔD' between the maximum value and the minimum value of the change amount, which makes it possible to avoid additionally searching an unnecessarily wide range and to detect the focusing position within a minimum additional search range.

It should be noted that, in the present embodiment, description is given by taking as an example the case where the focusing position of one of the image pickup systems is not detected when the AF control is performed with a range between the MOD and the infinite distance being set as the search range, but the similar processing is possible also in a macro region. In the case illustrated in FIG. 12, the difference ΔD' between the maximum value and the minimum value of the change amount of the search range at the temperature detected by the temperature detecting device 150 is obtained from the temperature characteristic table illustrated in FIG. 14, a range which is widened toward the telephoto side by the difference ΔD' between the maximum value and the minimum value of the change amount of the search range is set as the additional search range of the macro region, and the additional search is performed within the additional search range for the right image pickup system 12 whose focusing position has not been detected, which makes it possible to detect the focusing position of the right image pickup system 12.

In the second embodiment and the third embodiment, the temperature characteristic table illustrates the relation between the change amount ΔD of the search range and the temperature, but the contents of the temperature characteristic table are not limited to the relation between the change amount ΔD of the search range and the temperature. For example, the temperature characteristic table may illustrate a relation between a change rate of the search range and the temperature, and may illustrate a relation between a positional change amount of the MOD and the temperature.

In addition, in the second embodiment and the third embodiment, the change amount ΔD of the search range and the difference ΔD' between the maximum value and the minimum value of the change amount of the search range are set as the additional search range, respectively. Alternatively, a range obtained by adding a fixed value to ΔD or ΔD' may be set as the additional search range as needed.

The presently disclosed subject matter is not limitatively applied to the compound-eye image pickup apparatus, and can be applied to a case where a plurality of image pickup apparatuses are connected to each other to be used as the compound-eye image pickup apparatus.

What is claimed is:

1. A compound-eye image pickup apparatus, comprising:
a plurality of image pickup devices each including a focusing lens;
a moving device configured to move the focusing lens, the moving device being provided for each focusing lens;
an automatic focusing device configured to cause the moving device to move the focusing lens within a predetermined range, to thereby acquire focusing positions of each of the plurality of image pickup devices; and
a detecting device configured to detect whether or not the focusing position is acquired by the automatic focusing device, wherein
when the detecting device detects that the focusing position of at least one of the plurality of image pickup devices is acquired and the focusing position of the remaining image pickup device is not acquired, the automatic focusing device moves the focusing lens of the image pickup device for which it is detected that the focusing position thereof is not acquired, within an additional range outside of the predetermined range, to thereby acquire the focusing position thereof.

2. The compound-eye image pickup apparatus according to claim 1, wherein:
the image pickup devices each include:
an image pickup element on which a subject image is formed by a photographing optical system including the focusing lens; and
an image signal acquiring device configured to convert the subject image formed on the image pickup element into an image signal;
the automatic focusing device stops the focusing lens for each predetermined position within the predetermined range;
the image signal acquiring device acquires the image signal for each position at which the automatic focusing device stops the focusing lens; and
the automatic focusing device includes:
a focusing evaluation value calculating device configured to calculate a focusing evaluation value of the image signal which is acquired for each position by the image signal acquiring device; and
an additional range calculating device configured to compare the focusing evaluation values which are calculated by the focusing evaluation value calculating device for each of the plurality of image pickup devices, to thereby obtain the additional range.

3. The compound-eye image pickup apparatus according to claim 2, wherein
the additional range calculating device includes:

a determination device configured to determine to which position within the predetermined range of the image pickup device whose focusing position is acquired by the detecting device an end portion of the predetermined range of the image pickup device whose focusing position is not acquired corresponds;

a calculation device configured to calculate a distance between the detected position and the focusing position detected by the detecting device; and a setting device configured to set, as the additional range, a range between a position away from the end portion of the predetermined range by the calculated distance and the end portion of the predetermined range.

4. The compound-eye image pickup apparatus according to claim 1, further comprising:

a first storage device configured to store therein a relation between a change amount of the predetermined range and a temperature; and a temperature detecting device configured to detect a temperature of each of the plurality of image pickup devices, wherein the automatic focusing device acquires, from the first storage device, the change amount of the predetermined range corresponding to the temperature detected by the temperature detecting device, and obtains the additional range on the basis of the acquired change amount.

5. The compound-eye image pickup apparatus according to claim 4, wherein the first storage device stores therein a maximum value of the change amount when an individual variability in image pickup device is taken into consideration, as the change amount of the predetermined range.

6. The compound-eye image pickup apparatus according to claim 4, wherein:

the first storage device stores therein a maximum value and a minimum value of the change amount when an individual variability in image pickup device is taken into consideration, as the change amount of the predetermined range; and the automatic focusing device acquires, from the first storage device, a maximum value and a minimum value of the change amount of the predetermined range corresponding to the temperature detected by the temperature detecting device, and sets a difference between the acquired maximum value and the acquired minimum value as the additional range.

7. The compound-eye image pickup apparatus according to claim 1, wherein the automatic focusing device moves the focusing lens of the image pickup device for which it is detected that the focusing position thereof is not acquired, within a range obtained by adding a predetermined value to the additional range, to thereby acquire the focusing position thereof.

8. The compound-eye image pickup apparatus according to claim 4, wherein the automatic focusing device moves the focusing lens of the image pickup device for which it is detected that the focusing position thereof is not acquired, within a range obtained by adding a predetermined value to the additional range, to thereby acquire the focusing position thereof.

* * * * *